United States Patent
Kapadia

(10) Patent No.: US 9,747,259 B2
(45) Date of Patent: Aug. 29, 2017

(54) SEARCHING, REVIEWING, COMPARING, MODIFYING, AND/OR MERGING DOCUMENTS

(71) Applicant: Infinote Corporation, Sunnyvale, CA (US)

(72) Inventor: Yogen Kapadia, Sunnyvale, CA (US)

(73) Assignee: Infinote Corporation, Sunnyvale, CA (US)

( * ) Notice: Subject to any disclaimer, the term of this patent is extended or adjusted under 35 U.S.C. 154(b) by 383 days.

(21) Appl. No.: 14/322,848

(22) Filed: Jul. 2, 2014

(65) Prior Publication Data

US 2015/0012528 A1    Jan. 8, 2015

Related U.S. Application Data

(60) Provisional application No. 61/842,761, filed on Jul. 3, 2013.

(51) Int. Cl.
    *G06F 17/30* (2006.01)
    *G06F 17/22* (2006.01)
    *G06F 17/24* (2006.01)

(52) U.S. Cl.
    CPC ...... *G06F 17/2211* (2013.01); *G06F 17/2288* (2013.01); *G06F 17/241* (2013.01)

(58) Field of Classification Search
    None
    See application file for complete search history.

(56) References Cited

U.S. PATENT DOCUMENTS

| | | | |
|---|---|---|---|
| 7,584,199 B2* | 9/2009 | Matsusaka | G06F 9/526 |
| 7,949,938 B2* | 5/2011 | Champion | G06F 17/243 |
| | | | 715/209 |
| 8,589,426 B1* | 11/2013 | Miles | G06F 17/30634 |
| | | | 707/758 |
| 2013/0283147 A1* | 10/2013 | Wong | G06F 17/21 |
| | | | 715/234 |
| 2014/0101526 A1* | 4/2014 | Marsh | G06F 17/2288 |
| | | | 715/229 |
| 2014/0359421 A1* | 12/2014 | Allen | G06F 17/241 |
| | | | 715/230 |

* cited by examiner

*Primary Examiner* — Debbie Le
(74) *Attorney, Agent, or Firm* — Hickman Palermo Becker Bingham LLP

(57) ABSTRACT

Review, comparison, modification, and/or merging of multiple sources of data associated with media content are facilitated. Multiple documents can be simultaneously reviewed with a base document, and the changes or differences associated therewith can be flexibly reviewed, compared, accepted, and/or rejected to efficiently generate a new document having the changes or differences merged. Documents can be reviewed compared, modified, and/or merged based on sections of the base document. Efficient and selective search-and-replace of data associated with media content in files of various data sources or locations is thus enabled for a wide array of document tasks.

36 Claims, 20 Drawing Sheets

SEARCHING, REVIEWING, COMPARING, MODIFYING, AND/OR MERGING DOCUMENTS

CROSS-REFERENCE TO RELATED APPLICATIONS

The present application claims priority to U.S. Provisional Patent Application Ser. No. 61/842,761, entitled "REVIEWING, COMPARING AND/OR MERGING DOCUMENTS," filed on Jul. 3, 2013, which is hereby incorporated by reference.

TECHNICAL FIELD

This application relates generally to document search, document review, document comparison, efficient document modification, and/or merging of documents, and to various scenarios based on reviewing, comparing, efficiently modifying, and/or merging documents.

BACKGROUND

By way of background regarding conventional systems, electronic solutions for document search, document review, document comparison, efficient document modification, and/or merging of documents are limited in scope and functionality which, for example, requires large amounts of manual interaction and management across numerous data repositories, formats, and/or platforms. For example, a first document may be created in a source format (e.g., Microsoft® Word®) in a first repository, such as a directory or folder related to a mobile or desktop device associate with the author and/or containing other electronic documents. As the first document is shared or as copies are propagated to other users, e.g., such as by placing on a network share, via email, etc., the first document may be eventually rendered in a format different from the source format (e.g., such as portable document format (PDF), hypertext markup language (HTML), etc.).

In addition, as the copies of the first document propagate, they may become the subject of further revisions, for example, such as additions, deletions, modifications, comments, updates, links, additions of metadata, or otherwise, and so on. In order to keep apprised of such changes, or to compare various versions that may exist, the author or other user is typically required to open one document with its native application (e.g., Microsoft® Word®) and select a second document from within that native application, to generate a comparison document. Moreover, such conventional solutions are typically limited to comparing one version of a document with the original document or another version of the document.

However, various problems arise from this situation. As one example, each of the documents to be compared must be supported by the native application. As a further example, generally speaking, a Word® document cannot be compared to another document of a disparate format unless that disparate format is supported in the native application. In another example, a comparison of one document may only able to be compared to one other document at a time, especially in the case of proprietary document formats. Accordingly, where changes or differences may exist between the first document and any of a number of the propagated copies, the ability to track, review, compare, efficiently modify, and/or merge such changes or differences is typically limited to documents of the same format, and/or limited to, time-consuming manual one-on-one comparisons. In addition, conventional solutions for finding and replacing data associated with media content across numerous data repositories, and/or in disparate formats and/or platforms are similarly limited.

For instance, upon receiving a document for review electronically, a reviewer typically does not directly edit a document, and/or insert the desired changes or comments. A document-editing tool typically must be set in a mode so that the tool tracks changes made by the reviewer. If a reviewer performs the review using a tool that allows only annotation but not editing of the document, every change and/or comment needs to be specifically marked using the tool instead of simply updating the document. In addition, after completing the review, each reviewer sends the reviewed document back to the author either through the same or a different electronic system. The author can either print the original and reviewed documents and compares them outside the electronic system or can compare two documents at a time (either the original document and one reviewed document or two reviewed documents).

The above-described deficiencies of conventional solutions for document review, document comparison, document modification, and/or merging of documents are merely intended to provide an overview of some of the problems of conventional systems, and are not intended to be exhaustive. Other problems with the state of the art and corresponding aspects of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In one or more embodiments, data associated with media content can be searched, selected, reviewed, compared, modified, replaced, and/or merged with other data associated with media content.

In an example embodiment, a computer readable storage medium comprises computer executable instructions that, in response to execution, cause a system comprising at least one processor to perform operations. The operations can comprise receiving a first selection of a first file and receiving a second selection of second files. The operations can further comprise parsing the first file and the second files and determining a set of differences between the first file and the second files. In addition, the operations can comprise presenting a list of the set of differences and/or generating, in response to a request, a new file comprising a subset of data in the first file or one of the second files, where the request is based on a subset of the set of differences.

In another example embodiment, a computer readable storage medium comprises computer executable instructions that, in response to execution, cause a system comprising at least one processor to perform operations. The operations can comprise receiving a search location and a search property. The operations can further comprise searching the search location for a set of data locations satisfying the search property. In addition, the operations can further comprise presenting the set of data locations satisfying the search property and displaying the search property and a subset of surrounding content in a data location of the set of data locations in response to the data location of the set of data locations being selected.

In yet another exemplary embodiment, methods comprise receiving, by a system comprising a processor, a first selection of a first file and a second selection of second files via a user interface. The methods further comprise parsing, by the system, the first file and the second files and determining a set of differences between the first file and the second files. The methods additionally comprise presenting, by the system, a list of the set of differences via the user interface. The methods further comprise generating, by the system, in response to a request received via the user interface, a new file comprising a subset of data in the first file or in one of the second files, where the request received via the user interface is based on a first subset of the set of differences, and where the first subset of the set of differences is able to be viewed, selected, or accepted as a set via the user interface to facilitate the request.

In a further non-limiting embodiment, methods comprise receiving, by a system comprising a processor, search location data representing a search location and search property data representing a search property via the user interface. In addition, the methods comprise using the search location, searching, by the system, for a set of data locations satisfying the search property. The methods further comprise presenting, by the system, the set of data locations satisfying the search property via the user interface. Additionally, the methods can comprise, in response to a data location of the set of data locations being selected via the user interface, displaying, by the system, data representing the search property and a subset of surrounding content in the data location of the set of data locations.

In further exemplary embodiments, a system comprises a memory that stores computer-executable components, and a processor, communicatively coupled to the memory, that executes or facilitates execution of the computer-executable components. The computer-executable components can comprise a selection component configured to receive a search location and a search property; a parsing component configured to search the search location for a set of data locations that satisfy the search property; and a presentation component configured to display the set of data locations satisfying the search property, wherein the presentation component is further configured to display the search property and a subset of surrounding content in a data location of the set of data locations in response to the data location of the set of data locations being selected.

In other exemplary embodiments, a system comprises a memory that stores computer-executable components, and a processor, communicatively coupled to the memory, that executes or facilitates execution of the computer-executable components. The computer-executable components can comprise a selection component configured to receive a first selection of a first file and a second selection of second files via a user interface; a parsing component configured to determine a set of differences between the first file and the second files; a presentation component configured to display a list of the set of differences via the user interface; and/or an output component configured to generate, in response to a request received via the user interface, a new file comprising a subset of data in the first file or in one of the second files, where the request received via the user interface is based on a first subset of the set of differences.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
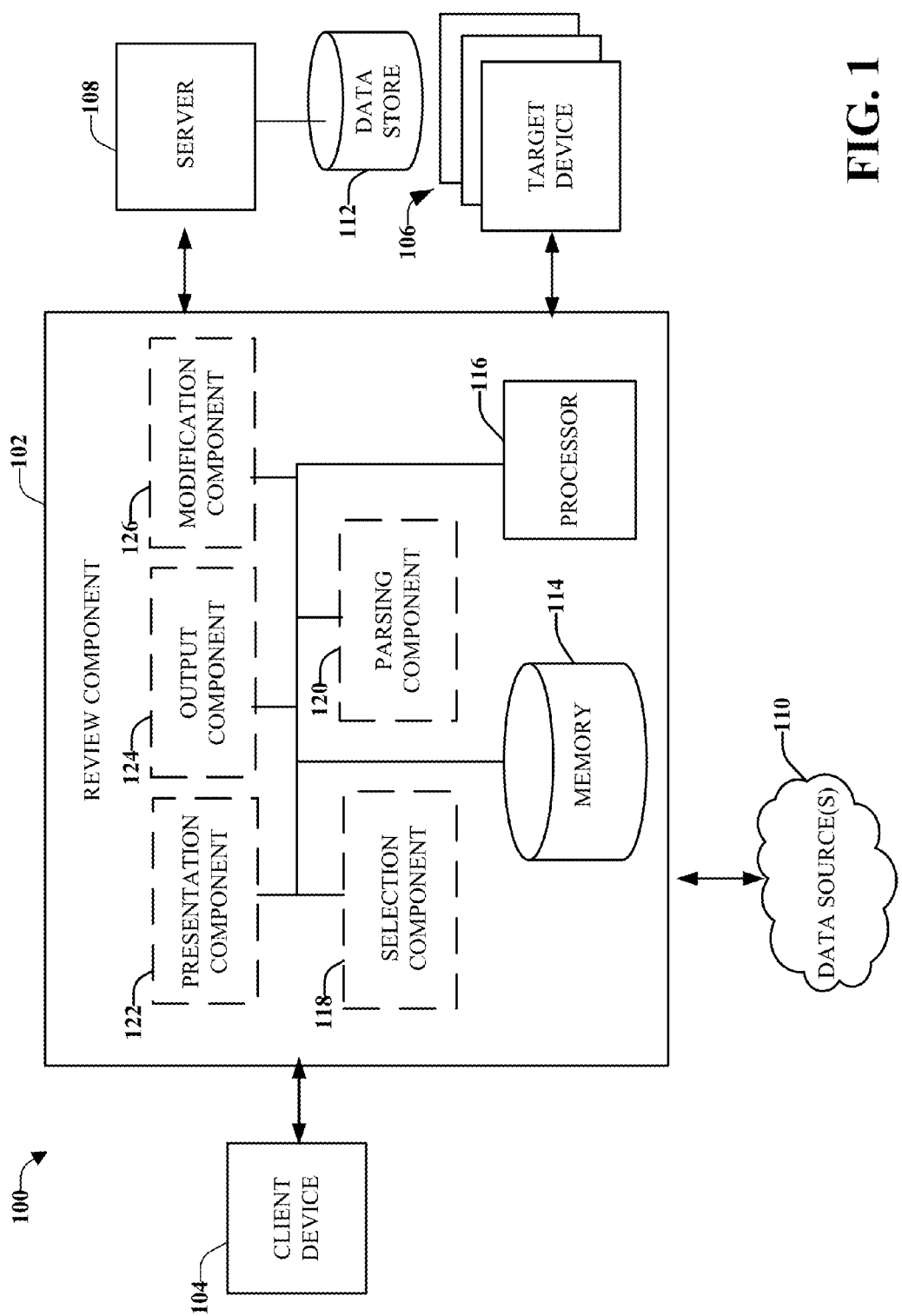
FIG. 1 illustrates an exemplary system that facilitates review, comparison, modification, and/or merging of data in the form of media content such as documents, images, graphical symbols in accordance with various embodiments described.

Embodiments and examples are described below with reference to the drawings, wherein like reference numerals are used to refer to like elements throughout. In the following description, for purposes of explanation, numerous specific details in the form of examples are set forth in order to provide a thorough understanding of the various embodiments. It will be evident, however, that these specific details are not necessary to the practice of such embodiments. In other instances, well-known structures and devices are shown in block diagram form in order to facilitate description of the various embodiments.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon such as with a module, for example. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements. Additionally, the words "set" or "sub-set" is used herein to refer to one or more of a component or item in which the term modifies or refers to and/or can include reference to, depending on the context, the empty set.

In addition, as further used herein, the terms, "modify," "modification," and the like can refer to, depending on context, efficient and selective search-and-replace of data associated with media content associated with files located on one or more data sources or locations, whereas in other contexts, the terms can be associated with editing, adding, deleting, etc. content associated with an individual change or difference of a list of a set of change or differences presented via a user interface.

As mentioned, conventional electronic systems for managing document reviews and electronic tools for editing and reviewing document do not enable an easy way to compare multiple reviewed documents with the original document, to show or hide reviews of select reviewers, accept or reject multiple changes by select reviewers in one click, accept non-conflicting changes in one-click nor control the granularity for viewing changes individually or as a group. In one or more embodiments, data associated with media content can be searched, selected, reviewed, compared, modified, replaced, and/or merged with other data associated with media content, for example, virtually without limitation, and/or without the various limitations posed by conventional solutions.

As a non-limiting example, in an aspect of one or more of disclosed embodiments, the disclosed embodiments can facilitate a document author searching, reviewing, comparing, replacing, and/or merging data associated with media content, for example, for data comprising media content such as documents having any number of revisions, (e.g., additions, deletions, modifications, comments, updates, links, additions of metadata, or otherwise, and so on, etc.) and/or any number of reviewers all at the same time electronically, instead of comparing only one piece of data associated with media content (e.g., a reviewed document) with another piece of data associated with media content (e.g., a base document) at a time. As will be understood, various embodiments described herein can be employed to review, compare, modify, and/or merge any number of unrelated data associated with media content. As an overview, a first item of data associated with media content (e.g., a base document) and a number of second items of data associated with media content (e.g., one or more second documents) can be selected for review and/or comparison.

Various embodiments facilitate providing a virtually unlimited number of sets, combinations, and/or permutations of changes or differences between the base document and the one or more second documents that can be viewed, hidden, selected, accepted, rejected, and so on, etc., to facilitate efficient review, comparison, modification, and/or merging of data associated with media content, as further described herein. Other non-limiting implementations facilitate efficient and selective search-and-replace of data associated with media content associated with files located on one or more data sources or locations.

Non-limiting aspects of one or more of the various embodiments include allowing reviewers to make changes directly to a document under review without having to switch on a mechanism to track changes, enabling authors to view the changes made by multiple reviewers all at once in one application, enabling selective view or hide changes by one or more reviewers, enabling acceptance or review multiple changes by a reviewer in one click, enabling acceptance of non-conflicting changes in one click, enabling control of the granularity for viewing changes individually or as a group, and/or enabling automatic tracking of documents being reviewed to facilitate the document review, compare and merge process.

Document Search, Review, Comparison, Modification, and/or Merge

In the following detailed description, reference will be made to the accompanying drawing(s), in which identical functional elements are designated with like numerals. The aforementioned accompanying drawings show by vary of illustration, and not by vary of limitation, specific embodiments and implementations consistent with principles of the present invention. These implementations are described in sufficient detail to enable those skilled in the art to practice the invention and it is to be understood other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of specialized hardware, or combination of both software and hardware.

FIG. 1 illustrates an exemplary system 100 that facilitates search, review, comparison, modification, replacement, and/or merging of data in the form of media content such as documents, images, graphical symbols, and the like. Media content is used herein to include audio, video, graphical, textual, and symbolic imagery. Although the example embodiments and aspects related to the examples may be described in relation to a document for ease of description, the example embodiments described herein can include any type of media such as video, audio, captured images, any combination of video, audio and graphical images, and the like. In addition, the terms, data associated with media content can describe information, such as a section, paragraph, sentence, one or more words and/or a title in a textual document, a portion of video and/or a graphical image, for example.

The system 100 can comprise a review component 102 that communicates with various devices, servers, and/or data sources to parse data associated with media content that is stored and/or being generated. The review component 102 can be located in any one device, server and/or data source and/or external thereto. For example, the review component 102 can be communicatively connected with a client device 104 and/or a target device 106, in which both can include a mobile phone, personal digital assistant (PDA), laptop, personal computer, any combination and the like. In addition, the review component 102 can be communicatively connected to a server 108 and/or data source(s) 110. The data source 110 can be a cloud infrastructure that enables access to data storage, for example.

The review component 102 is able to access and parse data associated with media content that includes libraries, files, documents, and data thereof from a memory 114, the data sources 110, the client device 104, a target device 106, and the server 108 associated with a data store 112, as well as other review components or set of data stores in communication with the review component 102. The data associated with media content can be stored in a memory 114, or elsewhere, such as in a separate repository, such as a database, where it can be accessed or shared across various other types of media content (e.g., documents). For example, the review component 102 can access or share data associated with media content stored among various media content, and also with media content being generated. For example, a document can be created through user input that includes a set of data associated with media content, such as digital text. Concurrent with the generation of the data associated with media content in the documents, the review component 102 is operable to present one or more further sets of data associated with media content, for example, from other documents that can be stored in the memory 114, the data sources 110, client device 104, target device 106, the server 108, the data store 112, and like sources, and/or portions thereof. In addition, each set of data associated with media content that is presented, all of one or more of the sets of sets of data associated with media content, and/or portions thereof can be parsed by the review component 102 to facilitate search, review, comparison, modification, replacement, and/or merging of data associated with media content. Likewise, the review component 102 is operable to efficiently and selectively modify (e.g., efficient and selective search-and-replace) any of a number of the further sets of data associated with media content.

Thus, in various non-limiting embodiments, review component 102 can include a processor 116 operatively coupled to one or more of a selection component 118, a parsing component 120, a presentation component 122, output component 124, and/or a modification component 126.

In various non-limiting embodiments, selection component 118 can be configured to receive one or more selections of data associated with media content, via a user interface such as a graphical user interface (GUI) to facilitate search, review, comparison, modification, replacement, and/or merging of data associated with media content. Accordingly, selection component 118 can be configured to receive a first selection of a first file and a second selection of second files via the user interface, for example, where the first and second files can comprise data associated with media content. In a non-limiting aspect, the second selection of second files can comprise a selection of a set of three or more files. In a further aspect, the first file can comprise a base document, and the second files can comprise any number of other documents, for which review component 102 can facilitate search, review, comparison, modification, replacement, and/or merging of data associated with media content of the first and second files. In addition, selection component 118 can be further configured to receive an annotation related to the first file or one or more of the second files, wherein the annotation comprises authorship information. For instance, the selection component 118 can receive information (e.g., indicating authorship, or otherwise, etc.), and/or the system 100 can detect and/or provide such information, for example, such that the information can be utilized to facilitate search, review, comparison, modification, replacement, and/or merging of data associated with media content of the first and second files.

In a further non-limiting aspect, selection component 118 can be further configured to receive a selection of files to be merged into the first file to create one or more new file(s). For instance, selection component 118 can be configured to receive a selection of a base document and any number of other documents, for which review component 102 can facilitate search, review, comparison, modification, replacement, and/or merging of data associated with media content of the first and second files, where the one or more new file(s) comprise all of the differences between the first file and the second files (e.g., all of the differences between the base document and the number of other documents), or at least a portion thereof. In another example, the differences between the first file and the second files (e.g., the differences between the base document and the number of other documents) can comprise any of a number of revisions, deletions, additions, and/or comments associated with the data associated with media content (e.g., data of the first file, data of the base document, etc.). In yet another non-limiting aspect, selection component 118 can also be configured to receive a choice of files (e.g., any number of other documents, etc.), where, for example, each file of the files can comprise data associated with media content, where the data comprises respective content associated with one or more corresponding section(s) of the first file (e.g., a base document, etc.), and for which review component 102 can facilitate selection of the respective content and merging of the respective content into the one or more corresponding section(s) of the first file (e.g., a base document, etc.).

In further non-limiting embodiments, a parsing component 120 can be configured to parse data associated with media content of the first file (e.g., data of the first file, data of the base document, etc.) and one or more second files (e.g., any number of other documents, etc.) to facilitate search, review, comparison, modification, replacement, and/or merging of data associated with media content of the first and second files. As a non-limiting example, parsing component 120 can be configured to parse data associated with media content, such as sections, paragraphs, pages, titles, or any portion of a document or data associated with media content that are being generated or already stored in a memory. For example, sections, paragraphs, pages, titles, or any portion can be parsed from the text of a document that is being created or stored, such as indicated by a selection of the first file (e.g., data of the first file, data of the base document, etc.) and one or more second files (e.g., any number of other documents, etc.). Accordingly, in a non-limiting aspect, parsing component 120 can be further configured to determine a set of differences between the first file and the second files. For instance, as noted, differences between a first file and any number of second files (e.g., the differences between the base document and the number of other documents) can comprise any of a number of revisions, deletions, additions, and/or comments associated with the data associated with media content (e.g., data of the first file, data of the base document, etc.). Thus, parsing component 120 can be configured to determine any of a number of revisions, deletions, additions, and/or comments associated with the data associated with media content (e.g., data of the first file, data of the base document, etc.).

In a further non-limiting aspect, parsing component 120 can be configured to determine the set of differences, for example, based on a predetermined value of a change threshold (e.g., a paragraph change threshold, a sentence change threshold, a section change threshold, etc.) that can be associated with a degree of difference between a portion of the first file and a corresponding portion of one of the second files. For instance, a first portion of a first document (e.g., data of the first file, data of the base document, etc.) can be determined by parsing component 120 to relate to, or be associated with, a second portion of a set of second documents, and, according to the predetermined value of a change threshold, can be determined to be a difference between the first document and one or more of the second documents (e.g., a difference between the base document and a number of the other documents). In a further non-limiting aspect, a change threshold (e.g., a paragraph change threshold, a sentence change threshold, a section change threshold, etc.) can comprise or be associated with a match of one or more words of the one or more second documents with at least a portion of the first document (e.g., data of the first file, data of the base document, etc.), a match and/or correspondence of a particular degree of data of the one or more second documents with at least the portion of the first document (e.g., section, paragraph, a sentence, etc.), a match and/or correspondence of a particular degree of a section title or content of a set of second documents with a section title of a the first document (e.g., data of the first file, data of the base document, etc.), a relevance score based on one or more of a set of predetermined criteria satisfying a condition, a frequency of reuse across different documents of a set of second documents satisfying a condition, a percentage of usage of at least a portion of a first document (e.g., data of the first file, data of the base document, etc.) within the set of second documents satisfying a condition, and/or a match and/or correspondence of a particular degree of metadata associated with a portion of a first document (e.g., data of the first file, data of the base document, etc.) with metadata associated with the one or more second documents.

In another non-limiting example, a predetermined value of a change threshold (e.g., a paragraph change threshold, a sentence change threshold, a section change threshold, etc.) associated with a degree of difference between a portion of the first file and a corresponding portion of one of the second files can be based on user input, that can be adjusted, for example, via the user interface. For instance, by adjusting the predetermined value of the change threshold to require a higher degree of match and/or correspondence, the parsing component 120 can be configured to determine the set of differences, for example, on a different level of granularity (e.g., word level, phrase level, sentence level, paragraph level, section level, etc.). Thus, in a non-limiting example, parsing component 120, can determine that a paragraph has changed (e.g., or is a difference, comparing data of the first file, data of the base document, etc., with data of one or more of the second files, data of one or more of the second documents, etc.) if the predetermined value of a change threshold (e.g., a paragraph change threshold) of 60%, for instance, has been met.

As described above, selection component 118 can be configured to receive a choice of files (e.g., any number of other documents, etc.), where, for example, each file of the files can comprise data associated with media content, where the data comprises respective content associated with one or more corresponding section(s) of the first file (e.g., a base document, etc.), and for which review component 102 can facilitate selection of the respective content and merging of the respective content into the one or more corresponding section(s) of the first file (e.g., a base document, etc.). Accordingly, in a further non-limiting example, parsing component 120 can be configured to determine a set of differences including determining a correspondence between the respective content and one or more corresponding section(s) of the first file (e.g., a base document, etc.). Thus, review component 102 can be further configured facilitate selection of the respective content and/or merging of the respective content into the one or more corresponding section(s) of the first file (e.g., a base document, etc.), based at least in part on the correspondence.

In other non-limiting implementations, a presentation component 122 can be configured to display a list of the set of differences between the first file (e.g., data of the first file, data of the base document, etc.) and one or more second files (e.g., any number of other documents, etc.) via the user interface to facilitate search, review, comparison, modification, replacement, and/or merging of data associated with media content of the first and second files. For example, in a non-limiting aspect, presentation component 122 can be further configured to display an option to accept and/or reject an individual difference in the list of the set of differences. In another non-limiting aspect, presentation component 122 can be further configured to provide an opportunity to undo one or more of an acceptance or a rejection of an individual difference in the list of the set of differences. In still further non-limiting aspects, presentation component 122 can be configured to provide an opportunity to undo one or more of an acceptance or a rejection of an individual difference in the list of the set of differences, regardless of the order in which the one or more of the acceptance or the rejection of the individual difference was undertaken. That is, whereas conventional solutions providing ability to undo accepted or rejected changes in the reverse time order of which the changes were accepted or rejected, without the ability to select and undo such changes out of order, various embodiments as described herein facilitate undoing one or more of individual accepted or rejected changes independent of the order in which such individual changes were accepted or rejected. As a result, various embodiments can facilitate intermediate states of data associated with media content based on the ability to accept, reject, undo, and/or redo various changes or differences in the list of differences out of order and without regarding to constraints of a time-based queue.

In a further aspect, presentation component 122 can be configured to display the list of the set of differences via the user interface as a series of listings of respective content in reverse chronological order of timestamps associated with the respective content via the user interface. For instance, each of the series of listings can be associated with any of a number of timestamps (e.g., date/time created, date/time last modified, date/time last synched, date/time last accessed, date/time last reviewed, and so on, etc.), without limitation. To further facilitate search, review, comparison, modification, replacement, and/or merging of data associated with media content of the first and second files, presentation component 122 can display the series of listings of respective content in a selected order (e.g., in reverse chronological order, in chronological order, and another order, etc.) of timestamps associated with the respective content. In addition, in another non-limiting aspect, presentation component 122 can also be configured to present, via the user interface, the series of listings with one or more of information associated with author, last modification, and/or location associated with the respective content.

In still further non-limiting aspects, presentation component 122 can be further configured to display detailed revision information associated with the individual difference in the list of the set of differences, for example, in response to receipt of an indication of interest via the user interface. For instance, review component 102 can be operable to receive user input (e.g., user input associated with mouse, keyboard, touch screen, and/or other human interface devices, etc.), such as, for example, mousing over or clicking on an individual difference in the list of the set of differences to facilitate search, review, comparison, modification, replacement, and/or merging of data associated with media content of the first and second files. In response thereto, presentation component 122 can display detailed revision information associated with the individual difference. In another example, such detailed revision information can include, but is not limited to, additions, deletions, revisions, and/or comments associate with the individual difference. As a further non-limiting example, the detailed revision information can be displayed by presentation component 122, for example, as data presented in pop-up window, in a panel of a multipanel GUI, in an output window, etc., and so on.

In other non-limiting aspects, presentation component 122 can be further configured to display a subset of the list of the set of differences. For instance, review component 102 can be operable to receive various commands (e.g., via a GUI), and/or other selections to facilitate search, review, comparison, modification, replacement, and/or merging of data associated with media content of the first and second files. As a result, presentation component 122 can display a subset of the list of the set of differences, for example, based on receipt of a command to accept, reject, display, or hide a subset of the set of differences associated with the authorship information. As a further non-limiting example, a command can be received by review component 102, for example, to accept all changes or differences associated with a particular file of the second files (e.g., changes or differences associated with a particular author or reviewer, changes or differences made before or after a certain date or time, such as a file last modified date, changes or differences based on a file location associated with one or more of the second files, and so on, etc.), and in response thereto, presentation component 122 can display a reduced set of differences between the first file (e.g., data of the first file, data of the base document, etc.) and one or more second files (e.g., any number of other documents, etc.). Similarly, other commands can be received by review component 102, without limitation, and presentation component 122 can display an appropriate listing of the set of differences to facilitate search, review, comparison, modification, replacement, and/or merging of data associated with media content of the first and second files.

In still further non-limiting aspects, presentation component 122 can be configured to present an option to one or more of accept or reject an individual difference in the list of the set of differences via the user interface. As above, review component 102 is operable to receive selections, commands, requests, and/or other indications, and so on associated with options provided to facilitate search, review, comparison, modification, replacement, and/or merging of data associated with media content of the first and second files. Accordingly, presentation component 122 can, via the user interface, present the option to accept or reject an individual change or difference in the list of the set of differences, and in response to an invocation of the option to accept or reject the individual difference, review component 102 can annotate the status of the option to accept or reject (e.g., annotate that the change or difference is accepted or rejected, pending, etc.) the individual difference, and the presentation component 122 can display such status via the user interface. As non-limiting examples, such annotations can comprise, but are not limited to, changing of a background, a font, a style, a format, or a behavior of text associated with the individual difference in the user interface, for example, for data associated with media content related to the first file (e.g., data of the first file, data of the base document, etc.) and/or one or more second files (e.g., any number of other documents, etc.).

In further non-limiting aspects, presentation component 122 can be configured to present various notifications or other user interface prompts or cues to facilitate search, review, comparison, modification, replacement, and/or merging of data associated with media content of the first and second files. As a non-limiting example, presentation component 122 can be configured to present a notification about a conflicting change or edit via the user interface. As above, review component 102 is operable to receive selections, commands, requests, and/or other indications, and so on associated with options provided to facilitate search, review, comparison, modification, replacement, and/or merging of data associated with media content of the first and second files. In a further non-limiting example, review component 102, and/or a portion or portions thereof, or components associated therewith, etc., can be configured to determine that a change or edit attempted for a set of differences would result in a conflicting change or edit, for example, as further described below regarding FIG. 10, etc. Accordingly, in response to a determination that a change or edit attempted for a set of differences would result in a conflicting change or edit, presentation component 122 can, via the user interface, present a notification about a conflicting change or edit via the user interface, for example, so as to inform a user that further review may be necessary. As non-limiting examples, such notifications can comprise or be associated with changing of a background, a font, a style, a format, or a behavior of text associated with the conflicting change or edit, a pop-up message, for example, without limitation.

In still other non-limiting embodiments, output component 124 can be configured to generate one or more new files comprising some or all of the differences between the first file and the second files (e.g., all of the differences between the base document and the number of other documents), or at least a portion thereof. As above, review component 102 is operable to receive selections, commands, requests, and/or other indications, and so on associated with options provided to facilitate search, review, comparison, modification, replacement, and/or merging of data associated with media content of the first and second files. Thus, in response to a request received via the user interface, output component 124 can generate one or more new files comprising a subset of data in the first file or in one or more of the second files. For example, review component 102 can receive a request via the user interface, (e.g., a request based on a first subset of the set of differences, etc.), and in response thereto, output component 124 can generate one or more new files comprising a subset of data in the first file or in one or more of the second files. As a further non-limiting example, a request based on a first subset of the set of differences can include, without limitation, a request to generate one or more new files comprising all non-conflicting changes or differences between the first file and the one or more second files (e.g., where a portion of the first file is not changed or different from more than one of the one or more second files), a request to generate one or more new files comprising, for example, all changes or differences attributable to a particular author or reviewer, all changes or differences occurring before or after a particular time, all changes or differences associated with a particular data location, and so on, etc. Accordingly, output component 124 can generate the one or more new files comprising the subset of the set of differences, where the subset of the set of differences comprises only changes or differences between the first file and no more than one of the second files (e.g., all non-conflicting changes or differences).

In various non-limiting embodiments, output component 124 can generate one or more new files, in response to review component 102 receiving the request as indicated by singular action undertaken by a user via the user interface. As a non-limiting example, various embodiments described herein can provide a button or other user interface component to facilitate generating the one or more new files comprising all non-conflicting changes or differences between the first file and the one or more second files that, in response to being selected by user via the user interface, can cause output component 124 to generate one or more new files. Similar interface components associated with review component 102 can be configured to facilitate output component 124 generation of the one or more new files according to other aspects described herein. For example, in a further non-limiting aspect, output component 124 can be configured to generate the one or more new files comprising the subset of data in the first file or in one or more of the second files, where the request received via the user interface is based on a subset of the set of differences, and where subset of the set of differences is able to be viewed, selected, and/or accepted and so on as a set via the user interface to facilitate the request. For instance, the first subset of the set of differences can be associated with all changes or differences attributable to a particular author or reviewer, all changes or differences occurring before or after a particular time, all changes or differences associated with a particular data location, and so on, etc. Thus, review component 102 is operable to receive a request to generate the one or more new files comprising based on such subsets of the set of differences capable of being viewed, selected, and/or accepted and so on as a set.

Accordingly, in various non-limiting embodiments, output component 124 can be configured to generate the one or more new files as one or more of a redlined file comprising annotations that indicate the subset of the set of differences (e.g., those changes or differences between the first file and the one or more second files) and/or a clean file without the annotations.

In further non-limiting embodiments, review component 102 and/or a portion thereof (e.g. modification component 126, etc.) is operable to receive user input (e.g., user input associated with mouse, keyboard, touch screen, and/or other human interface devices, etc.) associated with selections, commands, requests, and/or other indications, and so on to facilitate search, review, comparison, modification, replacement, and/or merging of data associated with media content of the first and second files. As a non-limiting example, modification component 126 can be configured to receive a command via the user interface to facilitate one or more of accepting, rejecting, displaying, and/or hiding a subset of the set of differences associated with information (e.g., indicating authorship, or otherwise, etc.) related to the first and/or one or more of the second files. Accordingly, in a further non-limiting aspect of modification component 126, a subset of the set of changes or differences can be accepted, rejected, displayed, and/or hid, as further described above, via the user interface, based on authorship information, based on information associated with a date and/or time, based on information associated with a file location, and so on, etc.

In yet another non-limiting aspect, modification component 126 can be further configured to restore the list of the set of differences via the user interface, for example, in response to receiving a request to undo all accepted and rejected changes associated with the list of the set of differences. In addition, according to a further non-limiting aspect of modification component 126, review component 102 and/or a portion thereof (e.g. modification component 126, etc.) is operable to receive input via the user interface to add or delete content associated with the individual difference of the list of the set of differences (e.g., such as by a user selecting the individual change or difference and/or editing content associate with individual difference). Thus, in response to receiving such input, presentation component 122 can be further configured to present the content via the user interface differently, for example, based on the whether the content is an addition or deletion. As above, non-limiting examples of differing presentations can comprise, but are not limited to, changing of a background, a font, a style, a format, or a behavior of text associated with the content in the user interface, for instance, depending on whether the content constitutes an addition or a deletion.

One or more of the selection component 118, the parsing component 120, the presentation component 122, the output component 124, and/or the modification component 126 can be operatively interconnected to facilitate search, review, comparison, modification, replacement, and/or merging of data associated with media content of the first and second files. In addition, system 100 is operable to generate the one or more new files as described herein and/or to modify one or more portion of one or more files or a number of portions of a number of files with a single click or other input as facilitated by system 100. The one or more new files as described herein and/or the modified files can be stored in a content repository, memory or data store of the data sources 110, client device 104, target device 106, server 108, memory 114, and/or elsewhere. In response to a user request any one of the documents that have been modified and/or created can be retrieved from their respective memories and the to facilitate further operations associated with searching, reviewing, comparison, modification, replacing, and/or merging data associated with media content of the first and second files.

Figure 2:
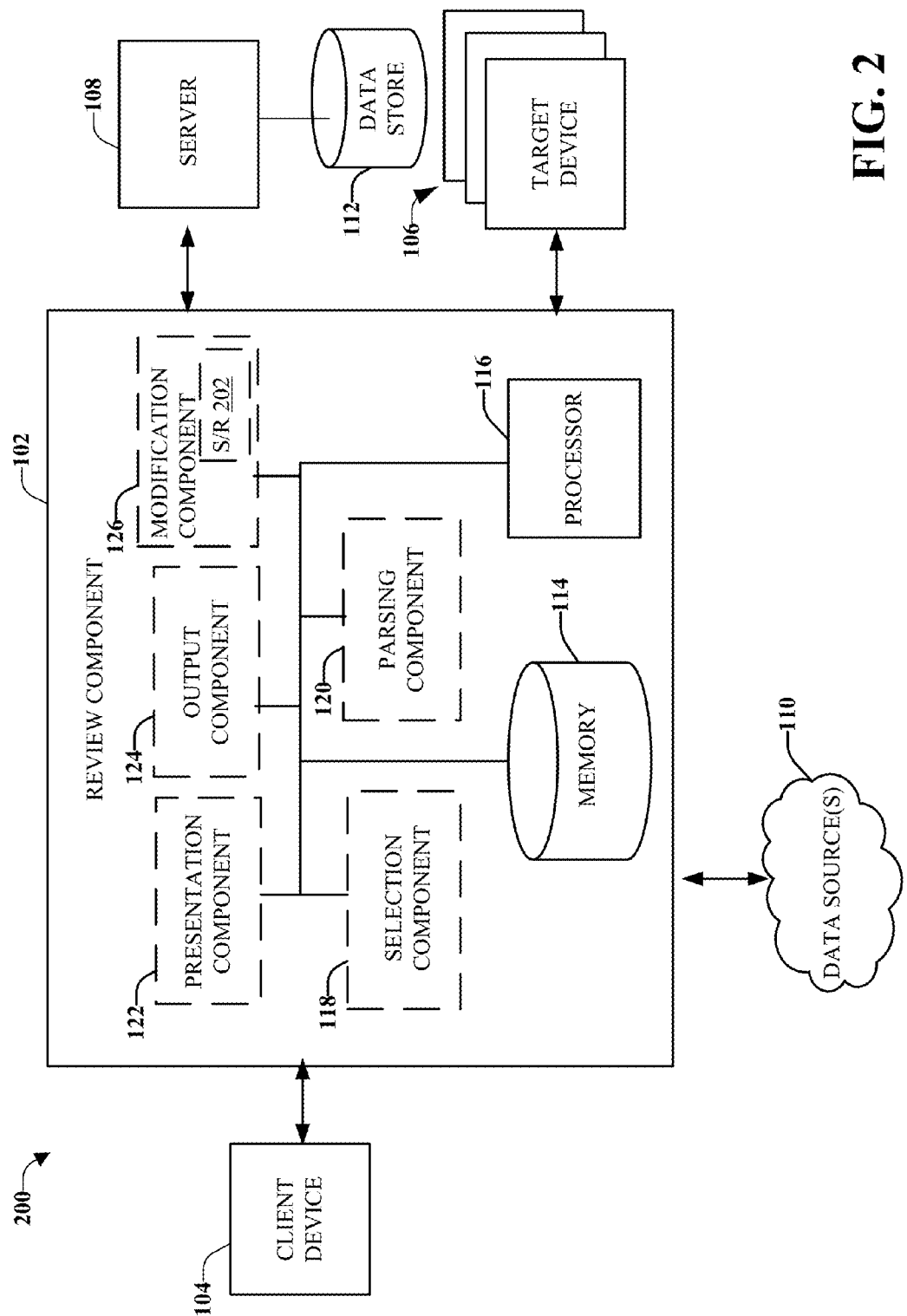
FIG. 2 illustrates an exemplary system for efficiently reviewing and/or modifying documents such as by searching and replacing data associated with media content in accordance with various embodiments described.

For example, FIG. 2 illustrates an exemplary system 200 for efficiently searching, reviewing, replacing, and/or modifying documents. As a non-limiting example, exemplary system 200 comprising modification component 126 can comprise, additionally and/or alternatively, a search and replace component (S/R 202) that facilitates efficient and selective search-and-replace of data associated with media content associated with files located on one or more data sources or locations (e.g., client device 104, target device 106, server 108, data source(s) 110, data store 112, memory 114, and so on, etc.). Accordingly, in addition to, or alternatively to, that described above regarding FIG. 1, system 200 can comprise or be associated with a review component 102 that can include a processor 116 operatively coupled to one or more of a selection component 118, a parsing component 120, a presentation component 122, output component 124, and/or a modification component 126 comprising search and replace component 202.

Accordingly, in non-limiting embodiments, selection component 118 can, additionally and/or alternatively, be configured to receive one or more of a search location and a search property. As non-limiting examples, search location can comprise information about location of data associated with media content related to files located on one or more data sources or locations (e.g., client device 104, target device 106, server 108, data source(s) 110, data store 112, memory 114, and so on, etc.). As a further non-limiting example, a search location can comprise one or more of a file or folder. In another aspect, a set of data locations can comprise one or more of a set of instances in a file or a set of instances in a set of files. In yet another non-limiting aspect, a search property can comprise data and/or information about which information about the instances and/or files in the search location is sought. In yet another non-limiting aspect, selection component 118 can, additionally and/or alternatively, be configured to receive data to replace the search property in a subset of the set of data locations (e.g., a set of instances in a file or a set of instances in a set of files, etc.). As a non-limiting example, review component 102, comprising selection component 118, modification component 126, and/or search and replace component 202, is operable to receive a search location and a search term or phrase, for which to search documents residing at the search location.

In addition, in a further non-limiting aspect, parsing component 120 can, additionally and/or alternatively, be configured to one or more of search the search location for a set of data locations that satisfy the search property, parse data associated with media content to facilitate determining whether the location satisfies the search property, and so on, etc. As a non-limiting example, parsing component 120 can be configured to one or more of parse one or more files residing at the search location, identify one or more instances in a file or a set of instances in a set of files that satisfy the search property, and so on.

In yet another non-limiting aspect, presentation component 122 can, additionally and/or alternatively, be configured to display the set of data locations satisfying the search property. As a non-limiting example, presentation component 122 can, additionally and/or alternatively, display the set of data locations satisfying the search property, where presentation component 122 is further configured to display the search property and a subset of surrounding content in a data location of the set of data locations in response to the data location of the set of data locations being selected. As a further non-limiting example, displaying the data representing the search property and the subset of surrounding content can comprise displaying, via the user interface, data representing an image, a word, a phrase, a sentence, or a paragraph associated with the search property and comprising a portion of data associated with media content at the respective data location of the set of data locations. For instance, in response to selection (e.g., via a mouse click, mouse over, and so on, etc.) of a particular data location (e.g., an instance in a file that satisfies the search property), presentation component 122 can display the search property as it exists in the file (e.g., at one or more instances in the file that the search property is satisfied) along with contextual data and/or information that surrounds the one or more instances in the file the search property is satisfied.

Accordingly, in a further non-limiting aspect, presentation component 122 can, additionally and/or alternatively, be configured to display the set of data locations satisfying the search property in a selectable and expandable tree view. Thus, by facilitating expansion of the set of data locations in an expandable tree view, and by allowing independently selectable data locations in the set of data locations, review component 102, comprising selection component 118, presentation component 122, modification component 126, and/or search and replace component 202, can facilitate efficient and selective search-and-replace of data associated with media content associated with files located on one or more data sources or locations (e.g., client device 104, target device 106, server 108, data source(s) 110, data store 112, memory 114, and so on, etc.). That is, each of the data locations of the set of data locations can be selected, reviewed, compared, and/or identified for replacement of the search property by the data received (e.g., data received by selection component 118 to replace the search property in a subset of the set of data locations) independently of the desired actions for the other data locations of the set of data locations. As above, review component 102 is operable to receive selections, commands, requests, and/or other indications, and so on associated with options provided to facilitate search, review, comparison, modification, replacement, and/or merging of data associated with media content. Accordingly, in a further non-limiting aspect, modification component 126, comprising search and replace component 202, can be further configured to replace the search property with the data in the subset of the set of data locations in response to receipt of a selection (e.g., review component 102, portions thereof, etc.) of the subset of the set of data locations.

Accordingly, system 200 is operable to modify data associated with media content across various data sources without to facilitate efficient and selective search-and-replace of data associated with media content associated with files located on one or more data sources or locations (e.g., client device 104, target device 106, server 108, data source(s) 110, data store 112, memory 114, and so on, etc.). For example, a user can desire modification (e.g., search-and-replace of data associated with media content) of particular instances of a sentence or a portion thereof pertaining to safety protocols, and system 200 can locate instances that satisfy a search property based on a provided search location. A user can then efficiently and selectively replace those instances of the search property, for example, by clicking or by providing some other input to independently select those data locations of a set of data locations that satisfy the search property. Thus, system 200 is operable to receive a selection input indicating which of those data locations of the set of data locations to modify. Based on the selection, the system 200, or a portion or portions thereof (e.g., output component 124, etc.), is operable to modify each of the selected data locations with the data received by selection component 118 to replace the search property in a subset of the set of data locations in order to make all of the selected instances the same, substantially the same substantially alike, or similar to the first content.

Regarding FIGS. 1 and 2 above, review component 102, or a portion or portions thereof (e.g., presentation component 122, etc.), is operable to generate a document view that operates in conjunction with aspects described herein that facilitate search, review, comparison, modification, replacement, and/or merging of data associated with media content, such as .doc, .pdf, and the like, for example, as further described herein regarding FIGS. 4-13. As a non-limiting example, a user display view (not shown) comprising a document view can have a first view area, a second view area, and a third view area. The first view area can be generated to display a list of the selections corresponding to the first and second files, respective authorship information for the first and second files, to provide user interface components to facilitate one or more of accepting or rejecting a set of changes or differences (and/or undoing the same), accepting all non-conflicting changes or differences, generating the one or more new documents, and so on, etc. The second view area can be generated to display a list of the set of changes or differences, change or difference summary information, information associated with the series of listings such as one or more of information associated with author, last modification, and/or location associated with the respective content, etc., and/or can be used to provide user interface components that facilitate one or more of accepting or rejecting of individual changes or differences in the list of the set of changes or differences (and/or undoing the same). The third view area can be generated to display, for example, detailed revision information associated with the individual change or difference in the list of the set of changes or differences, for example, in response to receipt of an indication of interest via the user interface, as described above. Further non-limiting embodiments of interface components that facilitate efficient and selective search-and-replace of data associated with media content associated with files located on one or more data sources or locations are further described herein, for example, regarding FIGS. 14-15.

Figure 3:
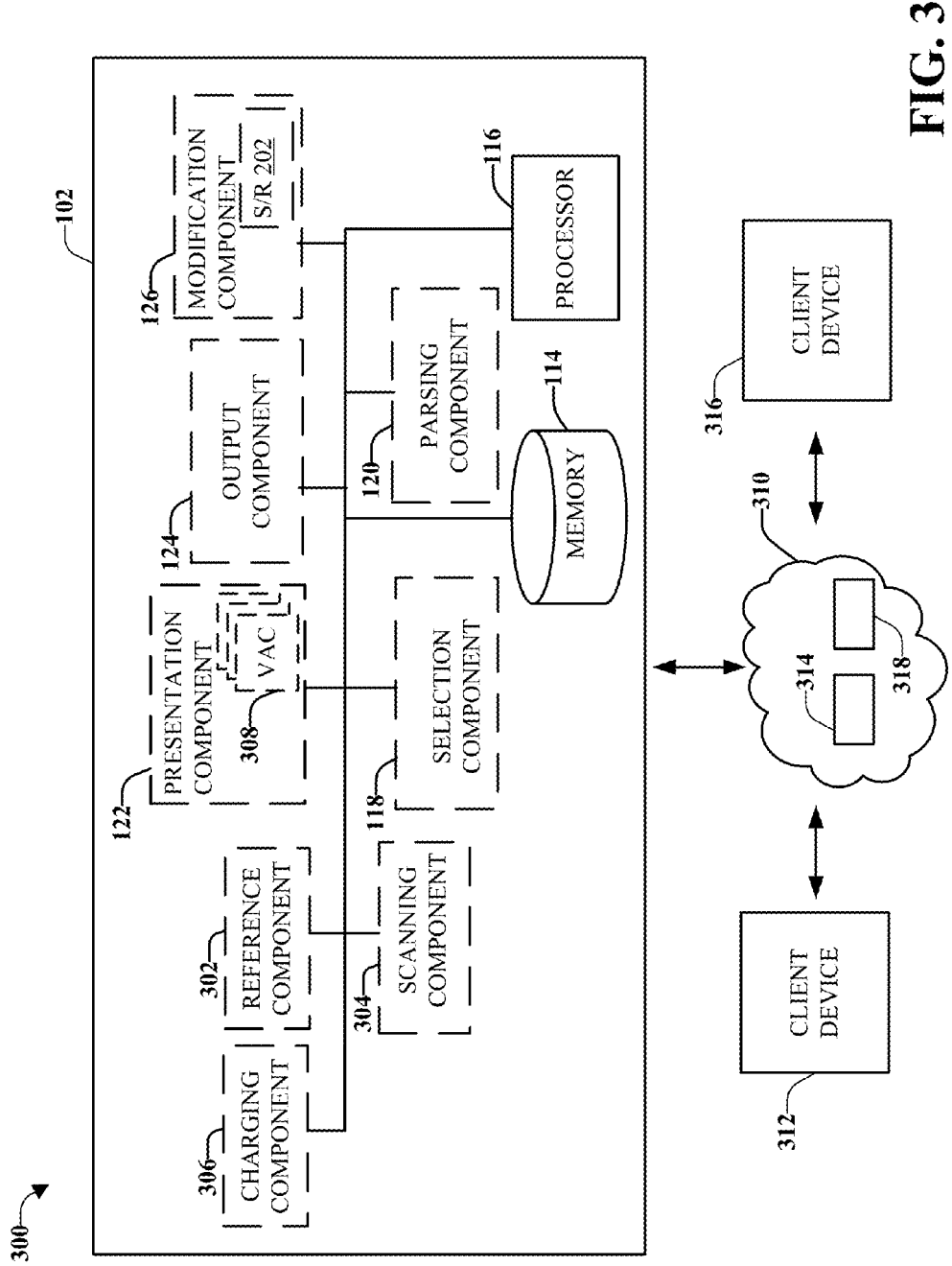
FIG. 3 illustrates an exemplary system that facilitates search, review, comparison, modification, replacement, and/or merging of data associated with media content in accordance with various embodiments described.

FIG. 3 illustrates a system 300 that includes review component 102 that facilitates search, review, comparison, modification, replacement, and/or merging of data associated with media content (e.g., digital documents, images, audio, video, etc.). System 300 is operable to search, parse, review, compare, modify, replace, and/or merge data associated with media content, for example. The system 300 comprises the review component 102 and can further comprise one or more of a reference component 302, a scanning component 304, and/or a charging component 306. Additionally, review component 102 can include memory 114, processor 116, selection component 118, the parsing component 120, the presentation component 122, the output component 124, and/or the modification component 126. In addition, the presentation component 122 can further comprise one or more view area component(s) (VACs) 308. For example, a first view area component, a second view area component, and a third view area component can be configured to generate a first, a second, and a third view area as described above.

In non-limiting embodiments reference component 302 is operable to generate references to different portions, sections, or otherwise, data associated with media content (e.g., a document, video and the like) with other portions, sections or otherwise for other data associated with media content. For example, the reference component 302 is operable to identify audit trails or different versions of portions of data associated with media content and record the different versions of the set of portions of data associated with media content with a tag or with metadata comprised in a reference. For example, portions of data associated with media content can be one or more words, sentences, paragraphs, sections, heading or titles of a document that are different from other portions, sections or otherwise for other data associated with media content. When a set of portions of data associated with media content from one document is changed with other portions of data associated with media content from a different document, reference component 302 can reference the former with the latter, for example, to facilitate search, review, comparison, modification, replacement, and/or merging of data associated with media content.

In one embodiment, portions of data associated with media content from a document (e.g., one of the one or more second files) can be presented by the presentation component 122 with a reference to a storage location of the respective document (e.g., the one of the one or more second files), in which the reference or tag includes the respective storage location. As such, portions of data associated with media content from a document (e.g., one of the one or more second files) can be parsed by the parsing component 120, such that the respective document (e.g., the one of the one or more second files) can be pre-parsed and indexed by parsing component 120 to facilitate search, review, comparison, modification, replacement, and/or merging of data associated with media content.

In another embodiment, one or more of the modification component 126, the presentation component 122, and/or a portion or portions thereof, are operable to, with the reference component 302, render a document view that can be dynamically compared, modified (e.g., a first file having one or more changes or differences accepted and/or rejected, having content added and/or deleted, being commented, and so on, etc.) based in part on the references that have been generated. To generate the one or more new files when requested or in response to a request by a user, the respective portions of the data associated with media content can be retrieved from their respective repositories and the document can be synthesized or otherwise pieced together according to the references or tags therein. For example, the modification component 126 can be configured to modify the presentation of the each portion of data associated with media content (e.g., one or more of the first file and/or one or more second files) according to the references or tags at each portion of the data associated media content (e.g., one or more of the first file and/or one or more second files).

In another embodiment, each tag or reference can include a genealogy of changes to data associated with media content (e.g., one or more of the first file and/or one or more second files). For example, a user can be presented via the presentation component 122 different portions of data associated with media content, for example, from other documents based on content provided or selected. System 300 can receive a modification input that selects all or a portion of data associated with media content (e.g., a portion of a first file). In response to the selection, the reference component 302 can provide references to corresponding portions of other data associated with other media content (e.g., respective portions of one or more of the one or more second files). Additionally, the reference component 302 is operable to generate tags or references that can include a genealogy of changes to data associated with media content, where each tag or reference is operable to link to different portions or updates generated along the lifespan of a modified or created document. Alternatively, the tag or references are indicators of a version history or properties of the modified documents or portions of the documents.

The system 300 can further comprise a scanning component 304 that can be configured to one or more of receive a scanned document image, recognize data associated with the scanned document with an optical recognition algorithm, such as optical character recognition or a like pattern recognition engine for recognizes characters, numbers, and/or images. The scanning component 304 can employ the analyzed data as the first file or one of the one or more second files, described above. The data associated with the scanned document can be employed to further facilitate search, review, compare, modify, replacement, and/or merge of data associated with media content by system 300.

In another embodiment, the system 300 can be extended with a charging component 306 to facilitate providing services over a public network, e.g., such as in providing software as a service, cloud-based services, software subscriptions, business-to-business software services, and/or content management system (CMS) services, etc. with an option for reimbursement on use. Thus, an efficient means of searching, reviewing, comparing, modifying, replacing, and/ or merging data associated with media content, which may or may not be associated with a registered copyright or a copyright can be utilized by providing access to data associated with media content across a number of documents or an entire network based on a charge or cost generated and received. For example, the charging component 306 can be configured to generate a cost, either automatically or through user input control and can be further configured to receive payment related to usage of system 300 by a user.

To facilitate searching, reviewing, comparison, modification, replacing, and/or merging of data associated with media content by system 300, review component 102, as discussed above, enables data associated with media content across various repositories, libraries and/or devices to be searched, parsed, reviewed, compared, modified, replaced, and/or merged with other data associated with media content. The system 300 illustrates further that system 300 is operable as a cloud-based system or any other system that capable of communicating data associated with media content among multiple repositories or data stores.

For example, the review component 102 can operate in a cloud network 310 that can provide different repositories associated with different clients and/or different data associated with media content (e.g., one or more of the first file and/or one or more second files). A client device 312 can be allocated to a data store 314, while a client device 316 can be allocated to a different data store 318, which may or may not be shared with other clients or customer devices. In one example, client device 316 could have access to the repositories of client device 312, for example, so that the charging component 306 can facilitate tracking of the content sections (e.g., a paragraph, a section of a document, a portion of an audio or video track, etc.) that may be under copyright protection within the various types of data associated with media content. The charging component 306, for example, can track usage of portions of data associated with media content (e.g., one or more of the one or more second files) that make up another portion of data associated with content (e.g., the first file merged with portions of one or more second files, etc.), such as, for example, compilations of copyrighted work. Based thereon, charging component 306 can generate a cost to receive payment that relates to authorship associated with a client associated with client device 312 and/or a number of selected portions of data associated with media content from data store 314 that client device 316 employs, modifies, copies, compiles, and/or merges with other data associated with media content in data store 318.

In another example, client device 312 and the corresponding data store 314 can be completely separated from client device 316 and the data store 318 associated therewith. Thus, enhanced security and protection can be enabled among data associated with media content by the review component 102, for example, for multiple client devices. Additionally, each client device 312 and 316 can be enabled to easily move and/or share data across different cloud providers and/or within a respective local area network (LAN). For example, a customer can start using the system 300 on an existing corporate IT infrastructure and then seamlessly move to a cloud, and vice versa.

In yet another example, a client associated with client device 312 can employ system 300, for instance, to facilitate searching, parsing, reviewing, comparing, modifying, replacing, and/or merging of data associated with media content across various repositories, libraries, and/or devices. As a non-limiting example, system 300 can employed as a CMS solution for a client associated with client device 312. For instance, the client associated with client device 312 may change business addresses or other information and require the ability to efficiently and cost-effectively update a website associated with the client. System 300 is operable to enable the client to efficiently and selectively search-and-replace data associated with media content (e.g., web pages of a website) associated with files located on one or more data sources or locations (e.g., client device 104, target device 106, server 108, data source(s) 110, data store 112, memory 114, cloud network 310, the internet, and so on, etc.). Whereas it may not be cost-effective for client associated with client device 312 to purchase a fully featured CMS product or hire an IT professional for such a non-routine mundane task, system 300 facilitates efficient and selective search-and-replace of the data associated with media content (e.g., web pages of a website), for example, such as by receiving search location data representing a search location (e.g., a base uniform resource locator (URL) of the website), search property data representing a search property (e.g., old address), and data to replace the search property (e.g., current address). In addition, charging component 306 can be further configured to calculate a competitive cost based on, for example, length of use, time of execution for the task, and so on, etc.

Figure 4:
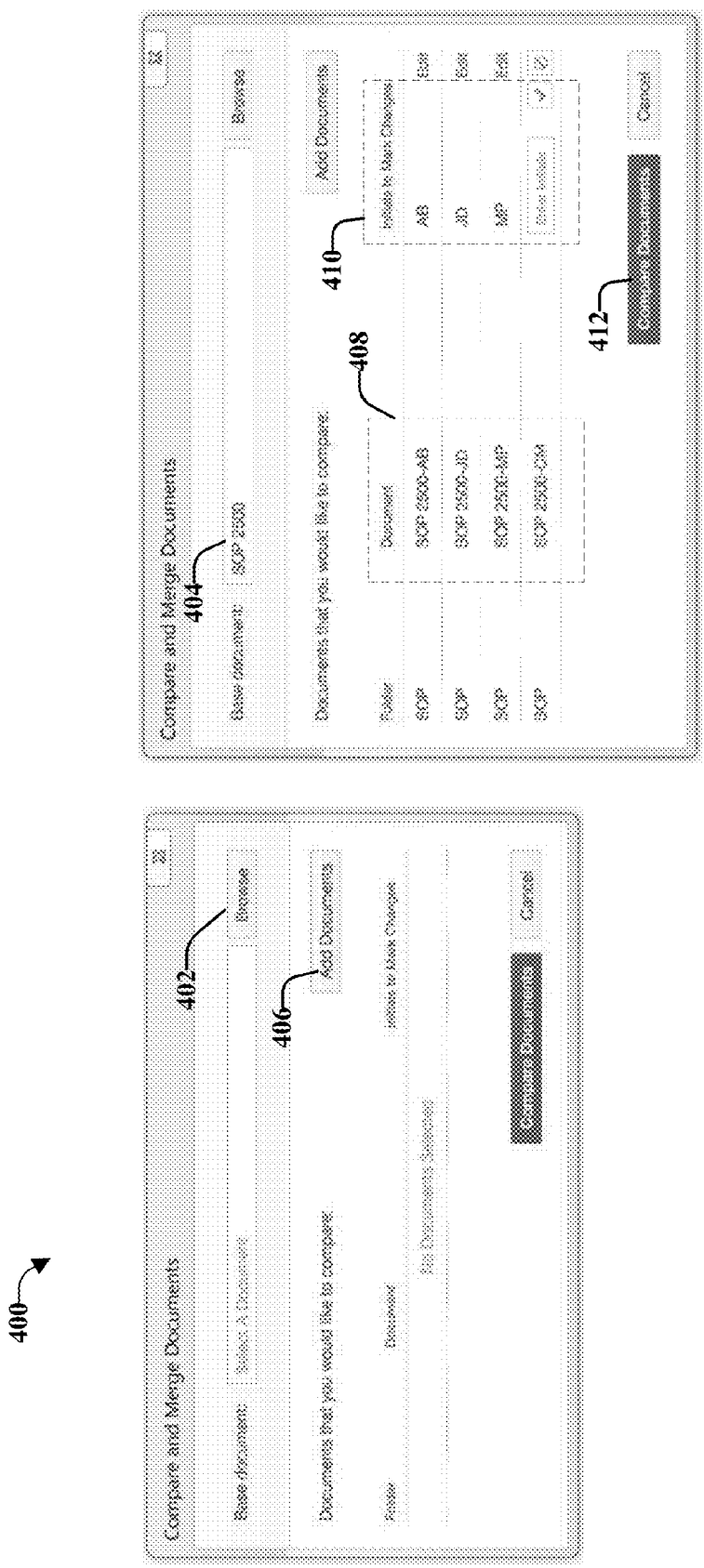
FIG. 4 depicts an exemplary user interface component that facilitates selection of data associated with media content for review, comparison, modification, and/or merging in accordance with various embodiments described.

FIGS. 4-15 depict various non-limiting examples of GUIs and/or user interface components suitable for use with exemplary aspects of the disclosed subject matter. For example, FIG. 4 depicts an exemplary user interface component 400 of a non-limiting system (e.g., system 100, system 200, system 300, etc.) that facilitates selection of data associated with media content for search, review, comparison, modification, replacement, and/or merging with other data associated with media content. It is noted that, for the purpose of illustration, and not limitation, the exemplary user interface component 400 is described as part of an add-on to an existing word processor (e.g., Microsoft® Word®) to facilitate search, review, comparison, modification, replacement, and/or merging of data associated with media content in the form of one or more word processing documents. Accordingly, a user can provide an input initiates employing various aspects as described herein. Thus, exemplary user interface component 400 can facilitate (e.g., via review component 102, selection component 118, portions thereof, etc.) a user providing a selection 402 of data associated with media content comprising a first file 404 as a base document for review, comparison, etc. Exemplary user interface component 400 further enables a user to provide a selection 406 of one or more second items of data associated with media content comprising the one or more second files 408, as well as to provide one or more annotations 410 of information (e.g., indicating authorship, or otherwise, etc.). Once the user is satisfied with the selections 402 and 406 and/or annotations 410, the user can begin parsing (e.g., via review component 102, parsing component 120, portions thereof, etc.) the first file 404 and the one or more second files 408 by providing user input 412 to exemplary user interface component 400 and determining a set of differences between the first file and the one or more second files. Accordingly, various embodiments described herein enables a user to compare data associated with media content, such as documents reviewed by multiple reviewers (e.g., the first file 404 and the one or more second files 408), all at the same time electronically instead of comparing only one reviewed document (e.g., only one of the one or more second files 408) with the base document (e.g., the first file 404) at a time. In a non-limiting aspect, a non-limiting system (e.g., system 100, system 200, system 300, etc.), as described herein, can be employed to compare any number items of data associated with media content, whether related, or otherwise.

Figure 5:
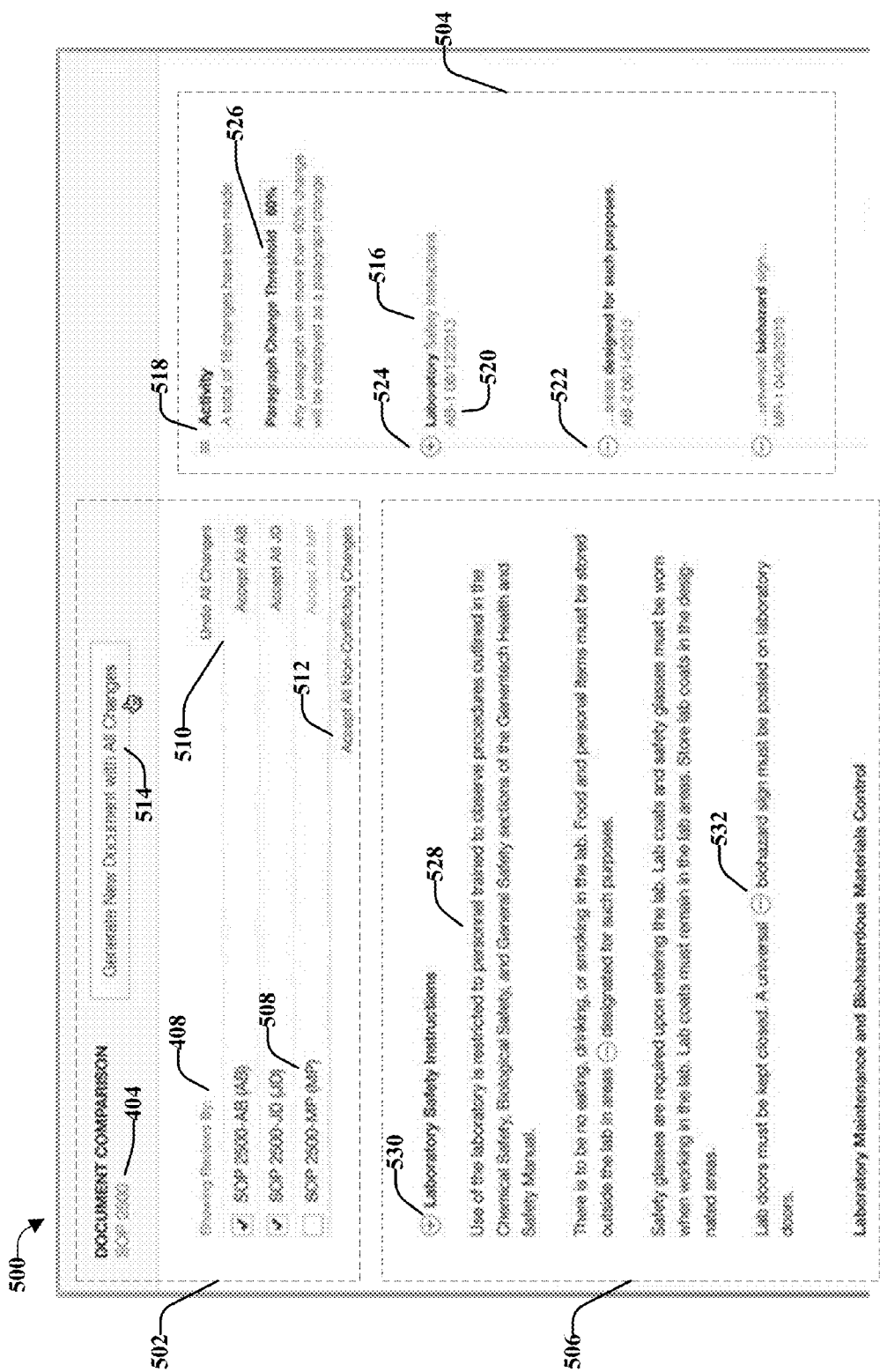
FIG. 5 depicts an exemplary user display view, showing changes or differences attributed to various reviewers with various actions that can be performed by a user to view, accept, reject changes or differences, make modifications, and/or create a merged document in accordance with various embodiments described.

FIG. 5 depicts an exemplary user display view 500 comprising a document view, showing changes or differences attributed to various reviewers with various actions that can be performed by a user to view, accept, reject changes or differences, make modifications, and/or create a merged document. As a non-limiting example, a user display view 500 comprising a document view can have a first view area 502, a second view area 504, and a third view area 506, for instance, as described above regarding FIGS. 1 and 2, that facilitates search, review, comparison, modification, replacement, and/or merging of data associated with media content. In non-limiting aspects, the first view area 502 can be generated to display a list of the selections corresponding to the first 404 and second files 408, respective information 508 (e.g., indicating authorship, or otherwise, etc.) for the first 404 and second files 408, to provide user interface components to facilitate one or more of accepting or rejecting a set of changes or differences (and/or undoing the same) 510, accepting all non-conflicting changes or differences 512, generating the one or more new documents 514, and so on, etc.

In further non-limiting aspects, the second view 504 area can be generated to display a list 516 of the set of changes or differences, change or difference summary information 518, information associated with the series of listings 520 such as one or more of information associated with author, last modification, and/or location associated with the respective content, etc., and/or can be used to provide user interface components 522, 524 that facilitate one or more of accepting or rejecting of individual changes or differences in the list of the set of changes or differences (and/or undoing the same), as well as user interface components that facilitate configuring parsing component 120 regarding a predetermined value of a change threshold 526 (e.g., a paragraph change threshold, a sentence change threshold, a section change threshold, etc.) that can be associated with a degree of difference between a portion of the first file 404 and a corresponding portion of one of the second files 408. In still further non-limiting aspects, the third view area 506 can be generated to display, for example, detailed revision information 528 associated with the individual change or difference in the list 516 of the set of changes or differences, for example, in response to receipt of an indication of interest via the user interface (e.g., via clicking on user interface components 522), as described above.

Accordingly, FIG. 5 depicts an exemplary user display view 500, showing changes or differences attributed to various reviewers. User display view 500 indicates whether text was added 530 or deleted 532 by a user. Thus, FIG. 5 additionally depicts a non-limiting mechanism for marking text additions 530 to be visually distinguishing from text deletions 532, as well as depicting numbered changes (e.g., information associated with the series of listings 520) made by a user along with the name or initials of the user.

FIG. 5 further depicts an exemplary mechanism 526 for controlling the granularity of changes being viewed. As described above, a non-limiting example, a user can choose to consolidate multiple changes in a given paragraph as a single, complete paragraph change if more than 60% of the paragraph has changed, thus enabling a user to control the level of granularity of changes being viewed. In addition, when a user hovers a mouse over or clicks on a change or difference (e.g., an individual change or difference in the list 516 of the set of changes or differences), non-limiting system (e.g., system 100, system 200, system 300, etc.) can be configured to animate the change or difference (not shown) and/or highlight the change or difference (not shown) (e.g., in third view area 506 such as for detailed revision information 528 associated with the individual change or difference in the list 516 of the set of changes or differences) so that the user can correlate the information of interest in the second view area 504 with the detailed revision information 528 in the actual area of the document to facilitate visualization of the change as an addition, for example. In a non-limiting aspect, text additions and deletion can be shown in visually distinct colors, such as, for example, blue and red, respectively (not shown). In a further non-limiting aspect, a further disparate color can be used to depict comments not shown.

Figure 6:
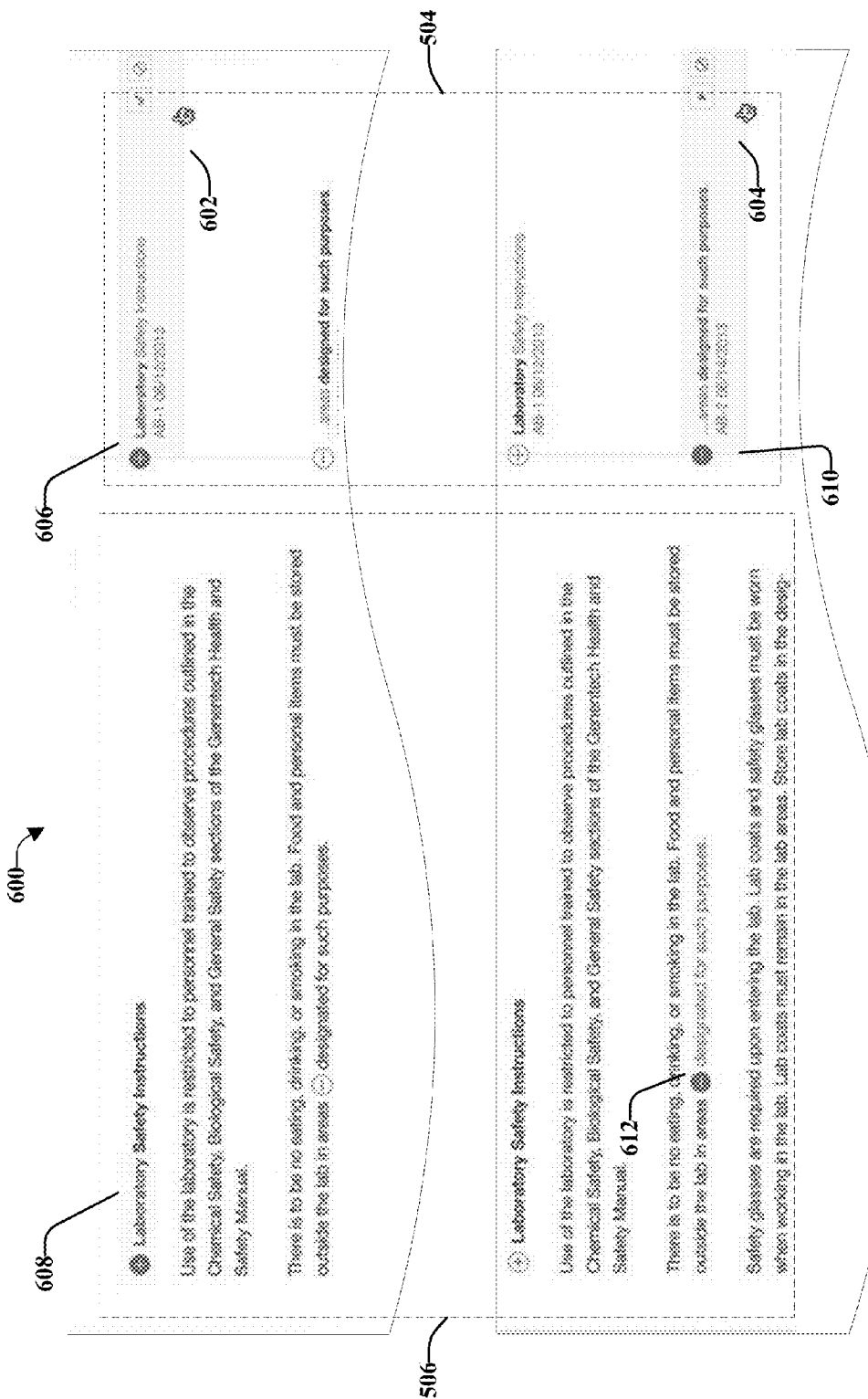
FIG. 6 depicts an exemplary user display view, showing changes or differences attributed to various reviewers, where, in response to a user hovering a mouse over or clicking on an individual change or difference in a list of a set of changes or differences, embodiments can indicate that a reviewer has added or deleted text in accordance with various aspects described.

FIG. 6 depicts an exemplary user display view 600, showing changes or differences attributed to various reviewers, where, in response to a user hovering a mouse over or clicking on an individual change or difference 602, 604 in a list 516 of a set of changes or differences, embodiments can indicate that a reviewer has added 602 (e.g., blue highlighting at 606 and 608) or deleted 604 text (e.g., red highlighting at 610 and 612). It should be noted that various visual effects could be substituted for colored highlighting depicted in FIG. 6, including, but not limited to, alternatives such as animation of changed text, connecting of lines from the second view area 504 to respective portions of the third view area 506, etc.

Accordingly, exemplary user interface component 400 can facilitate (e.g., via review component 102, selection component 118, portions thereof, etc.) a user providing a selection 402 of data associated with media content comprising a first file 404 as a base document for review, comparison, etc. For instance, a user can select to show or hide all changes by one or more reviewer, as indicated in FIG. 5, as a non-limiting example. A user can uncheck a checkbox in front of a reviewed document associated with a reviewer (e.g., at 508), and that reviewer's changes and comments can be hidden from the list 516 of the set of changes or differences. Upon inserting the checkmark again in the checkbox, the changes and comments of the reviewer can begin be presented in the list 516 of the set of changes or differences. In addition, as further depicted in FIG. 5 (e.g., at 510) a user can accept all changes made by a particular reviewer in one click. For example, to accept all the changes recommended by the reviewer with initials AB, the user can click on the associated "Accept all AB" user interface component (e.g., the "Accept all AB" hyperlink). In a further non-limiting aspect, a user can also accept all non-conflicting changes as further described herein. In other words, changes or differences made by or attributed to all the reviewers that do not conflict or otherwise overlap each other, can be accepted, for example, in one click, as depicted in FIG. 5 (e.g., 512), such as by clicking the "Accept All Non-Conflicting Changes" user interface component (e.g., the "Accept All Non-Conflicting Changes" hyperlink).

In further non-limiting aspects, exemplary embodiments also enable a user to accept or reject individual changes, for example, by clicking on an "Accept" or a "Reject" option that can be presented when a particular change or difference is highlighted (e.g., at 602, at 604, etc.). In addition, similar options can also be used to toggle changes from an accepted state to a rejected state and vice versa. As further indicated in FIG. 6, a change or difference that is accepted or rejected either individually or a part of any of the bulk operations (e.g., except all, reject all, undo all, etc.) can be visually marked as described above, or otherwise, so that it can be made evident to a user that the change or difference has been processed. Accordingly. In a non-limiting aspect, associated circles depicting addition (+) or deletion (−) can be shaded with a color such as gray or other colors. As further depicted in FIG. 5, a user can also undo all actions and reset the document review to start state in one click (e.g., clicking "Undo All Changes" user interface component or hyperlink at 510), as a non-limiting example. In addition, as further described herein, various embodiments also enable the user to generate a merged document in one click after the user is done accepting and/or rejecting changes recommended by or differences attributable to the reviewers. As a non-limiting example indicated in FIG. 5, a user can clicks on the "Generate New Document With All Changes" user interface component or button, various embodiments described herein can merge all changes or differences accepted by the user attributable to different reviewers. In response, a user can be provided an option to provide a document name or various embodiments can use an auto-generated document name.

User interfaces and/or associated components described above regarding FIGS. 4-6 have been described as add on functionality to an existing application (e.g., Microsoft® Word®). However, various embodiments described herein are not so limited. As non-limiting examples, FIGS. 7-15 provide further exemplary implementations, and/or associated components while providing examples of further non-limiting aspects of the disclosed subject matter. For example, various non-limiting embodiments described herein (e.g., exemplary system 100, exemplary system 200, exemplary system 300, exemplary system or device 1600, etc.) can be implemented as a standalone application, for desktop devices, for mobile devices, and so on, and/or can be implemented partially or substantially over a network, such as in the case of cloud computing services, software as a service, and so on, etc.

Figure 7:
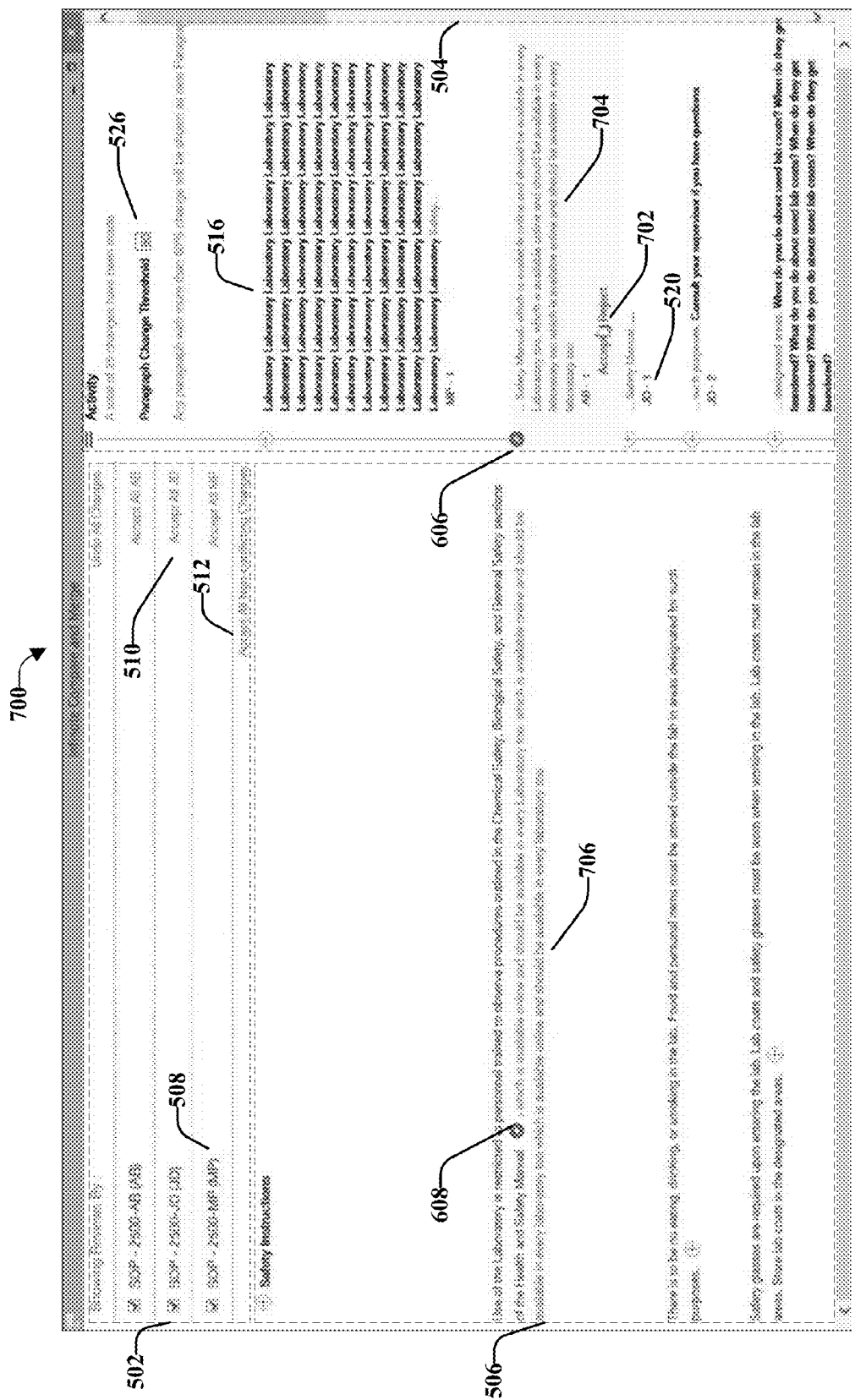
FIG. 7 depicts a further non-limiting user interface that facilitates selection of data associated with media content for review, comparison, modification, and/or merging in accordance with various embodiments described.

Thus, FIG. 7 depicts a further non-limiting user interface 700 that facilitates selection of data associated with media content for search, review, comparison, modification, replacement, and/or merging. Accordingly, in addition to details provided above, FIG. 7 depicts an "Accept" and a "Reject" option at 702 that can be presented when a particular change or difference is highlighted (e.g., blue highlighting at 606 and 608) in response to a user hovering a mouse over or clicking on an individual change or difference 704 in a list 516 of a set of changes or differences, where embodiments can indicate that a reviewer has added (e.g., blue highlighting at 606 and 608) text 706.

Figure 8:
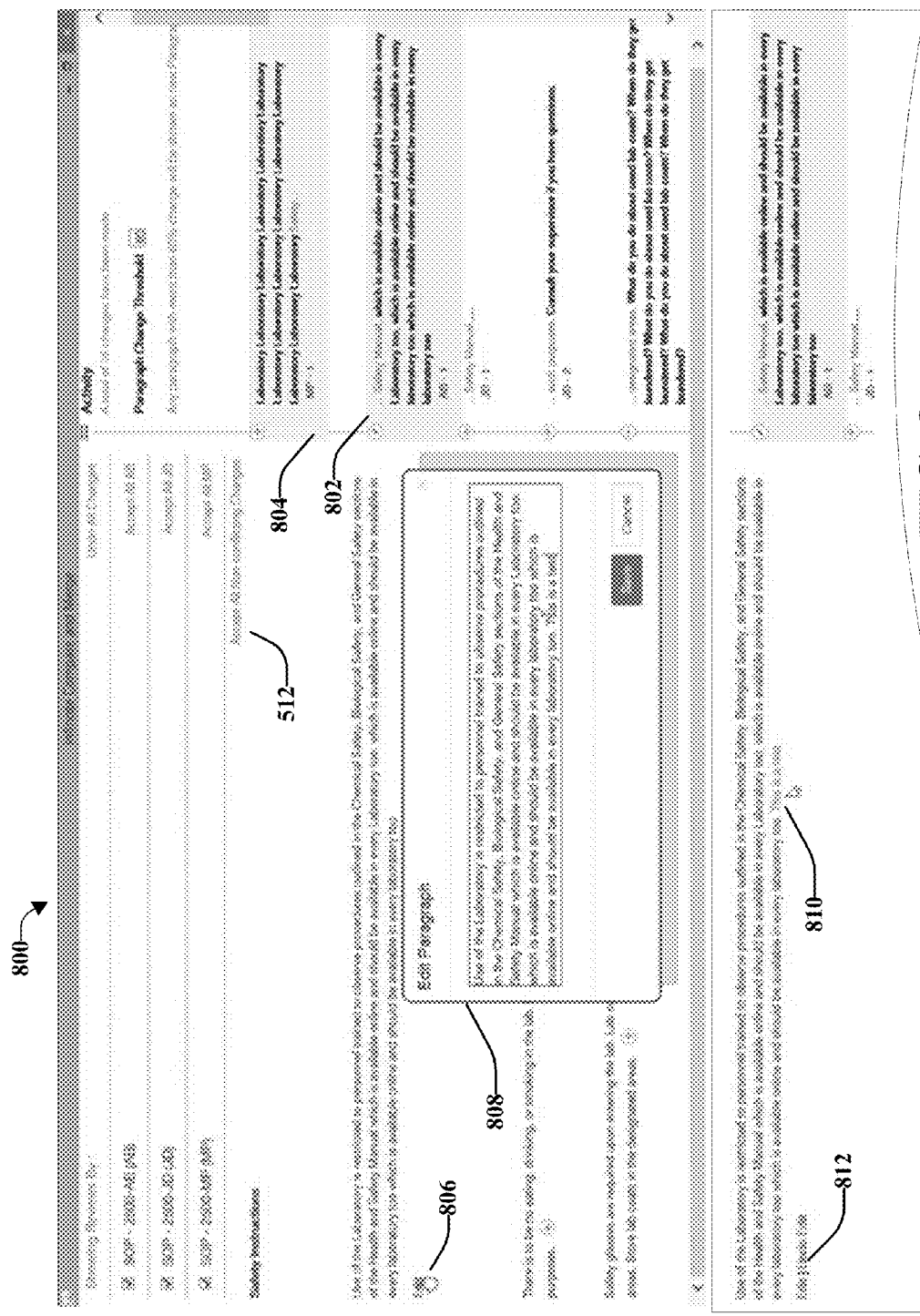
FIG. 8 depicts further non-limiting aspects of an exemplary user interface that facilitates selection of data associated with media content for review, comparison, modification, and/or merging in accordance with various embodiments described.

In addition, FIG. 8 depicts further non-limiting aspects of an exemplary user interface 800 that facilitates selection of data associated with media content for search, review, comparison, modification, replacement, and/or merging, where the status of individual changes or differences in the list 516 of a set of changes or differences is indicated. As a non-limiting example, in various embodiments, an accepted change or difference 802 can be displayed with persistent background highlighting of a certain color (e.g., green background in FIG. 8), whereas a rejected change or difference 804 can be displayed with persistent background highlighting of a disparate color (e.g., orange background in FIG. 8).

FIG. 8 further depicts another non-limiting aspect of various embodiments described herein, where a user can be provided the ability to edit at 806 the data associated with media content (e.g., conduct additions, deletions, revisions, etc.) within exemplary user interface 800 to further facilitate search, review, comparison, modification, replacement, and/or merging of data associated with media content. In response to clicking the user interface component (e.g., "edit" user interface component or hyperlink 806), various embodiments can provide the ability to edit the data associated with media content, e.g., such as, providing a pop-up, editing dialog box 808, and so on, etc., in a further non-limiting aspect. In addition, the edited data associated with media content 810 can be displayed, and the user can be provided with the ability to further edit and/or undo 812 prior edits made by the user within exemplary user interface 800. In addition, as further described above, changes or differences made by or attributed to all the reviewers that do not conflict or otherwise overlap each other, can be accepted, for example, in one click, as depicted in FIG. 5 (e.g., 512), such as by clicking the "Accept All Non-Conflicting Changes" user interface component (e.g., the "Accept All Non-Conflicting Changes" hyperlink 512). For instance, results are depicted below regarding FIG. 9.

Figure 9:
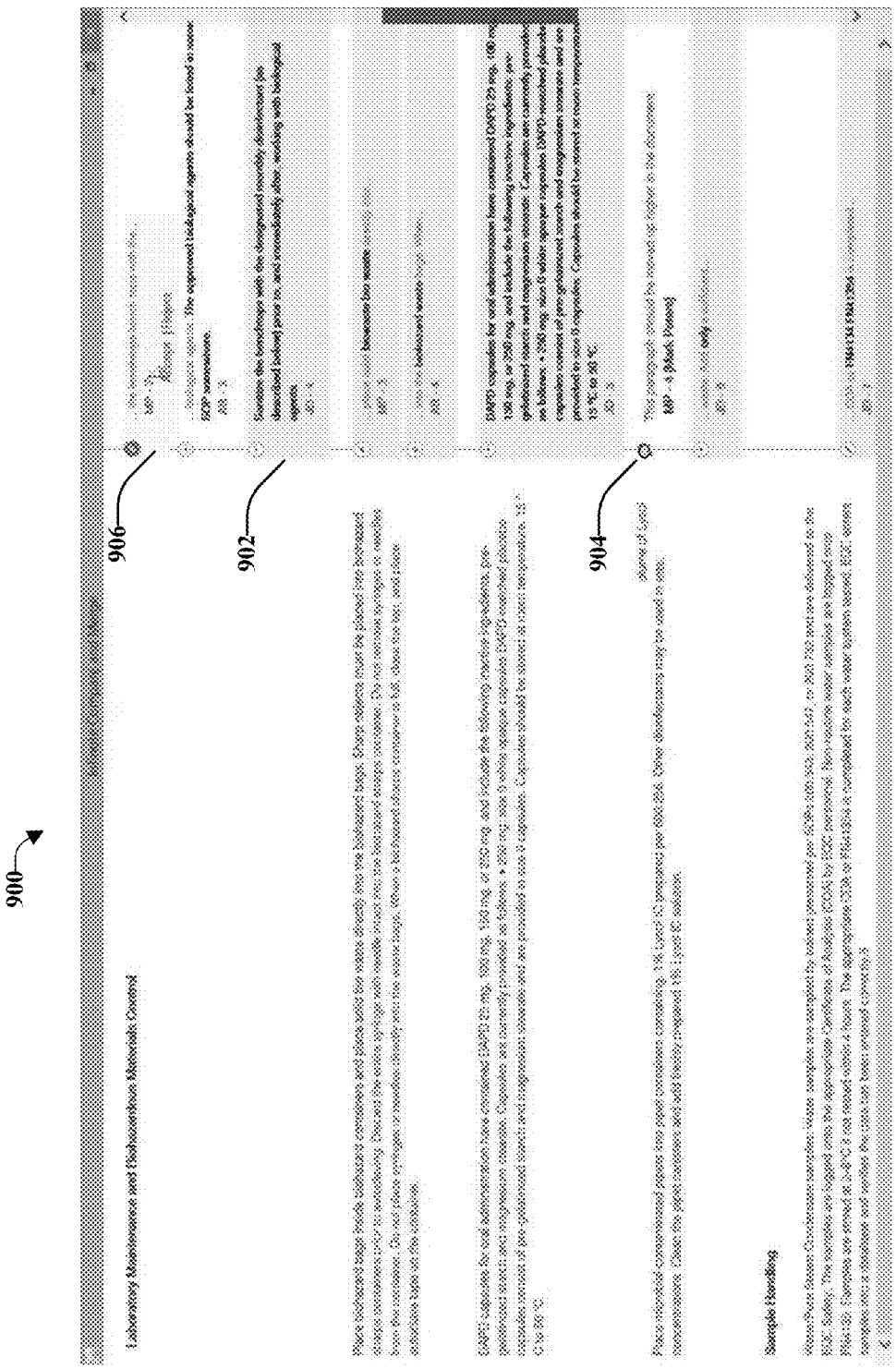
FIG. 9 depicts an exemplary user display view, showing status of changes or differences as a result of accepting all non-conflicting changes or differences in accordance with various embodiments described.

For example, FIG. 9 depicts an exemplary user display view 900, showing status of changes or differences as a result of accepting all non-conflicting changes or differences in accordance with various embodiments described. In various non-limiting aspects, the accepted non-conflicting changes or differences can be displayed with persistent background highlighting 902 of a certain color (e.g., green background as described above regarding FIG. 8). FIG. 9, further depicts distinctive symbols 904 identifying data associated with comments made about data associated with media content, and further illustrates the ability to distinguish conflicting changes or differences 906, for example, by persisting the default background color of a non-accepted and non-rejected change or difference, by persisting the presentation of the ability to accept or reject the change or difference, and so on.

Figure 10:
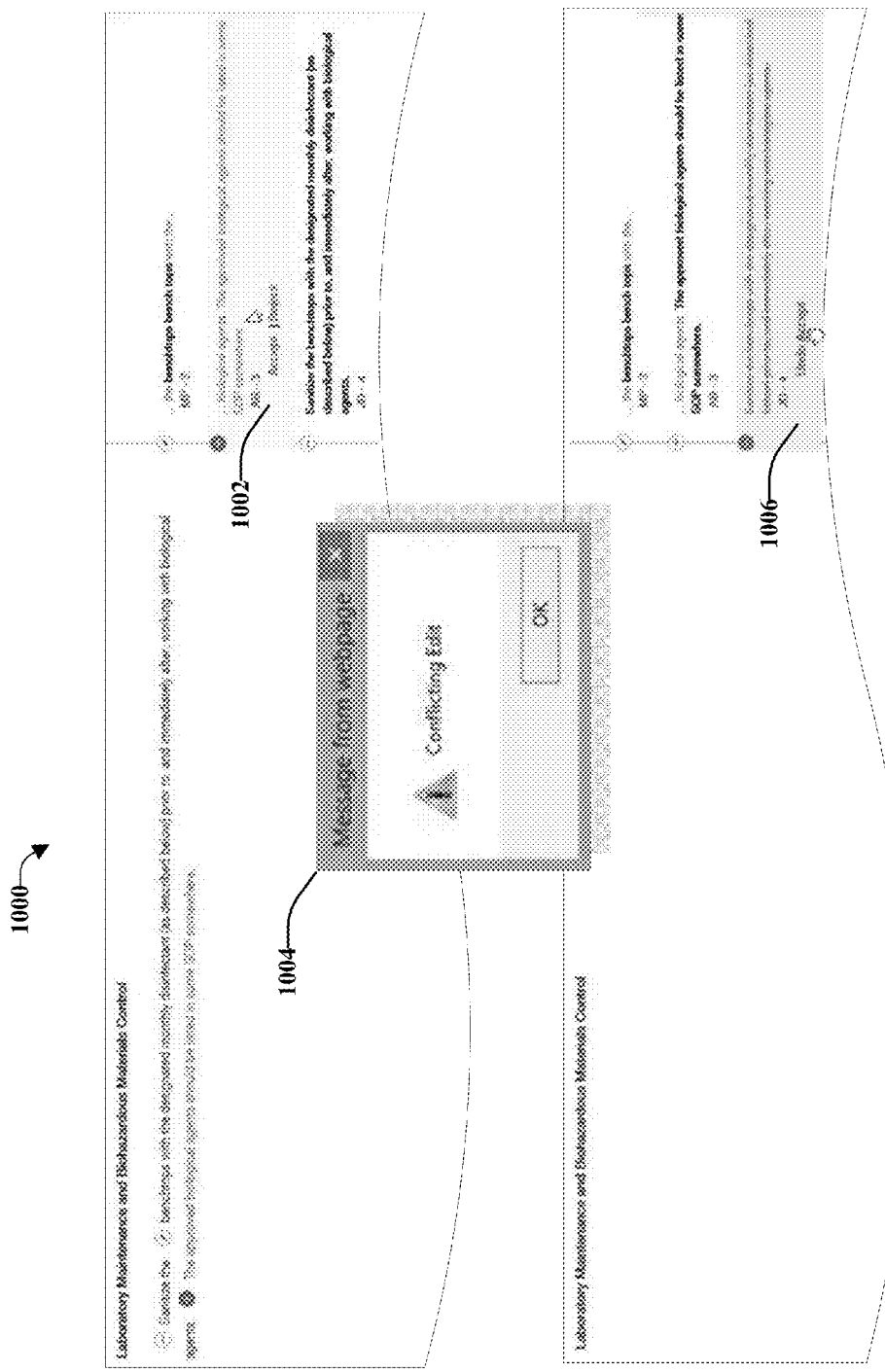
FIG. 10 depicts an exemplary user display view, showing status of changes or differences and an exemplary warning as a result of conducting a conflicting change or edit in accordance with various embodiments described.

In addition, FIG. 10 depicts an exemplary user display view 1000, showing status of changes or differences and an exemplary warning notification presented via a user interface as a result of conducting a conflicting change or edit. As a non-limiting example, for conflicting changes or differences (e.g., MP-2 and AB-3) a user can be presented the option to accept or reject one or more of the conflicting changes or differences. For instance, a user opting to accept change or difference AB-3 at 1002, can be provided a warning notification 1004 that such an action would result in conducting a conflicting edit, according to various non-limiting, so as to inform a user that further review may be necessary. As a result, a user may opt to undo 1006 a prior acceptance, rejection, change, edit, and so on.

Figure 11:
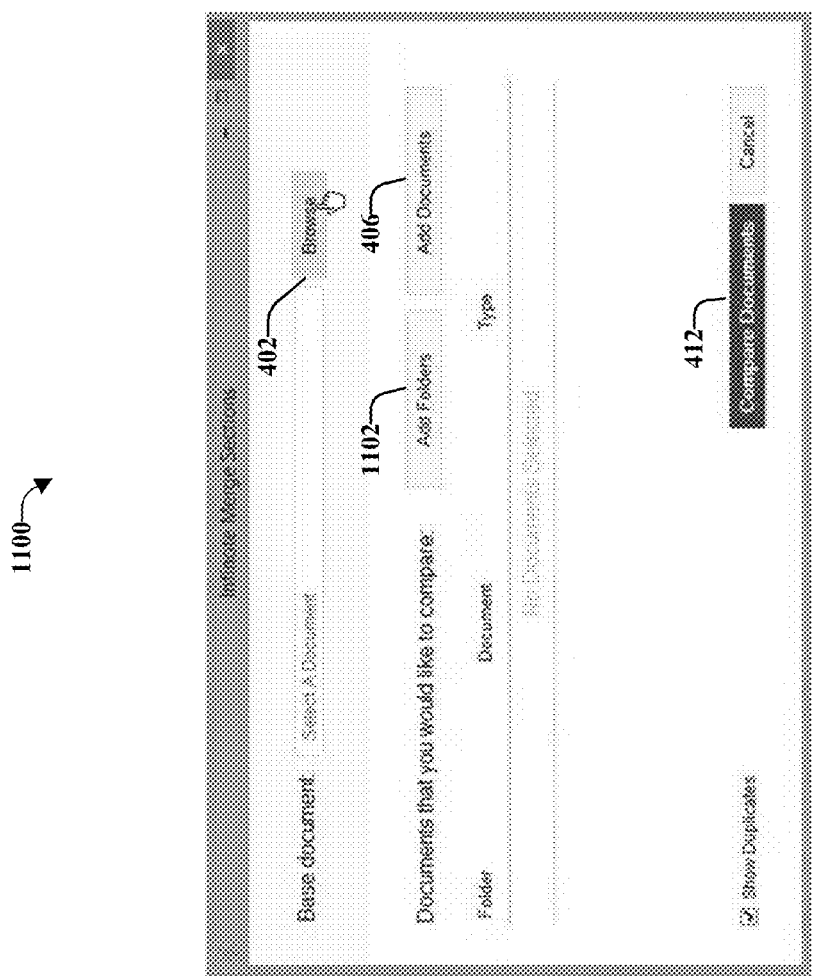
FIG. 11 depicts an exemplary user interface component that facilitates selection of data associated with media content for review, comparison, modification, and/or merging in relation to sections in accordance with various embodiments described.

According to further non-limiting embodiments, FIG. 11 depicts an exemplary user interface component 1100 that facilitates selection of data associated with media content for search, review, comparison, modification, replacement, and/or merging in relation to sections and/or merging sections, for example. Thus, in addition to facilitating (e.g., via review component 102, selection component 118, portions thereof, etc.) a user providing a selection 402 of data associated with media content comprising a first file 404 as a base document for review, comparison, etc., exemplary user interface component 1100 further enables a user to provide a selection 406 of one or more second items of data associated with media content comprising the one or more second files 408, as well as to provide a selection 1102 of a folder comprising one or more second items of data associated with media content. Once the user is satisfied with the selections 402 and 406 and/or 1102, the user can begin parsing (e.g., via review component 102, parsing component 120, portions thereof, etc.) the first file 404 and the one or more second files 408 by providing user input 412 to exemplary user interface component 400 and determining a set of differences between the first file and the one or more second files, for example, as further described herein. For instance, as described above, selection component 118 can be configured to receive a choice of files (e.g., any number of other documents, such as via a selection 1102 of a folder, via a selection 406 of one or more second items of data associated with media content, etc.), where, for example, each file of the files can comprise data associated with media content, where the data comprises respective content associated with one or more corresponding section(s) of the first file (e.g., a base document, etc.), for example, as further depicted below regarding FIGS. 12-13. In addition, as described, review component 102 can facilitate selection of the respective content 802, 804 and merging of the respective content into the one or more corresponding section(s) of the first file (e.g., a base document, etc.). Thus, as further described above, parsing component 120 can be further configured to determine a set of differences including determining a correspondence between respective content and one or more corresponding section(s) of the first file (e.g., a base document, etc.). Thus, review component 102 can be further configured facilitate selection of the respective content and/or merging of the respective content into the one or more corresponding section(s) of the first file (e.g., a base document, etc.), based at least in part on the correspondence.

Figure 12:
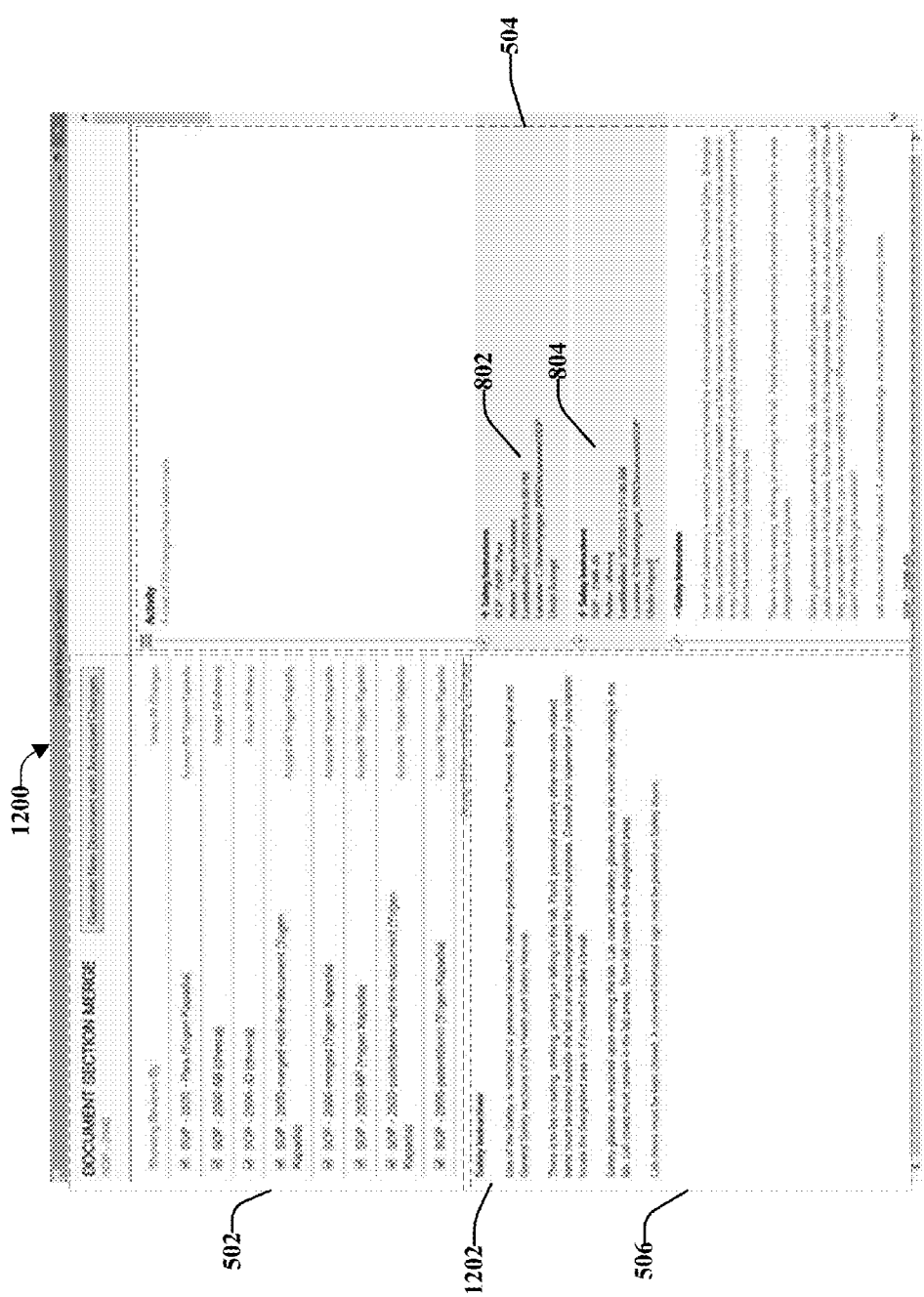
FIG. 12 depicts further non-limiting aspects of an exemplary user interface that facilitates selection of data associated with media content for review, comparison, modification, and/or merging in relation to sections in accordance with various embodiments described.
Figure 13:
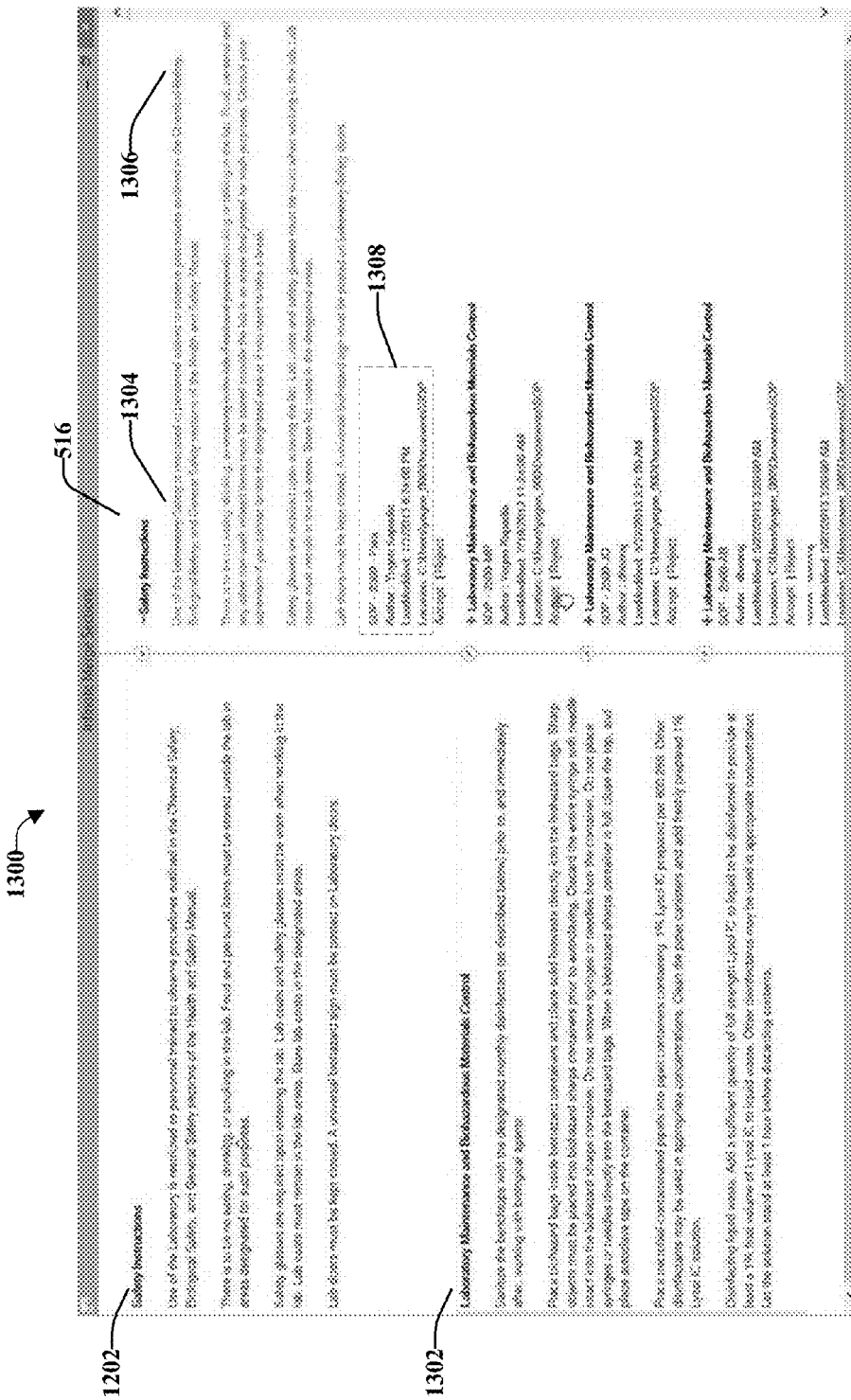
FIG. 13 depicts still further non-limiting aspects of an exemplary user interface that facilitates selection of data associated with media content for review, comparison, modification, and/or merging in relation to sections in accordance with various embodiments described.

FIG. 12 depicts further non-limiting aspects of an exemplary user interface 1200 that facilitates selection of data associated with media content for search, review, comparison, modification, replacement, and/or merging in relation to sections (e.g., Safety Instructions section 1202, etc.). FIG. 13 depicts still further non-limiting aspects of an exemplary user interface 1300 that facilitates selection of data associated with media content for search, review, comparison, modification, replacement, and/or merging in relation to sections (e.g., Safety Instructions section 1202, Laboratory Maintenance and Biohazardous Materials Control section 1302, etc.). Note that, in non-limiting aspects, the list 516 of the set of changes or differences can be presented according to corresponding sections (e.g., Safety Instructions section 1202, Laboratory Maintenance and Biohazardous Materials Control section 1302, etc.), where individual additions 1304 and/or deletions 1306 can be presented, indicated, and/or highlighted, as described herein. In addition, according to various embodiments as described above regarding presentation component 122, presentation component 122 can be configured to display the list of the set of differences via the user interface as a series of listings of respective content (e.g., corresponding to respective sections, Safety Instructions section 1202, Laboratory Maintenance and Biohazardous Materials Control section 1302, etc.) in reverse chronological order of timestamps associated with the respective content via the user interface.

For instance, as further described above each of the series of listings can be associated with any of a number of timestamps (e.g., date/time created, date/time last modified, date/time last synched, date/time last accessed, date/time last reviewed, and so on, etc.), without limitation. To further facilitate search, review, comparison, modification, replacement, and/or merging of data associated with media content of the first and second files, presentation component 122 can display the series of listings of respective content in a selected order (e.g., in reverse chronological order, in chronological order, and another order, etc.) of timestamps associated with the respective content. In addition, in another non-limiting aspect, presentation component 122 can also be configured to present, via exemplary user interface 1300, the series of listings with one or more of information 1308 associated with author, last modification, and/or location associated with the respective content, as well as any other metadata associated with the respective content, without limitation.

Figure 14:
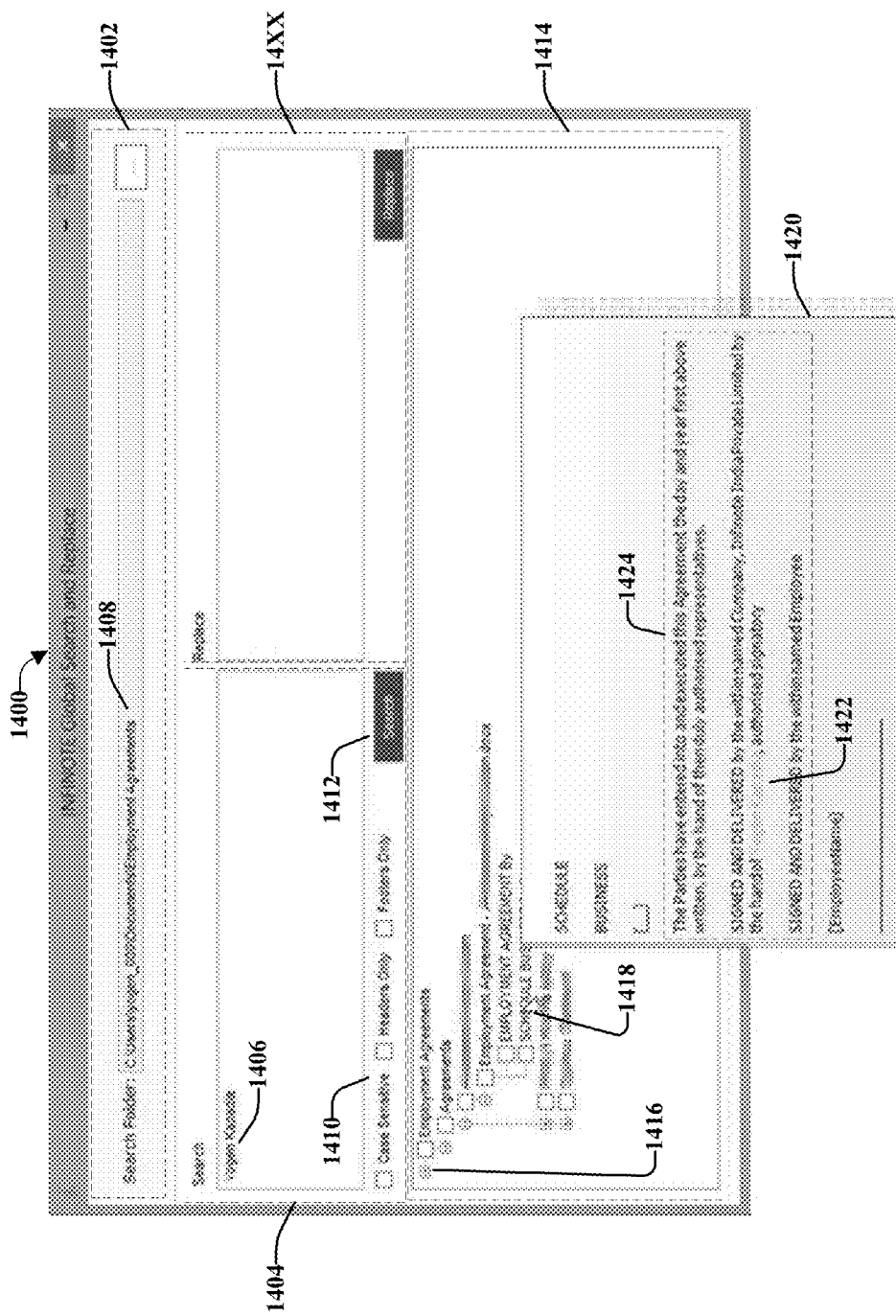
FIG. 14 depicts non-limiting aspects of another exemplary user interface that facilitates efficient and selective search-and-replace of data associated with media content associated with files located on one or more data sources or locations in accordance with various embodiments described.

FIG. 14 depicts non-limiting aspects of another exemplary user interface 1400 that facilitates efficient and selective search-and-replace of data associated with media content associated with files located on one or more data sources or locations. As a non-limiting example, exemplary user interface 1400 can have a first view area 1402 that facilitates receiving search location data representing a search location via exemplary user interface 1400. In a further non-limiting example, exemplary user interface 1400 can have a second view area 1404 that facilitates receiving search property data 1406 representing a search property via exemplary user interface 1400. For instance, a user can input, or browse to and select, a location 1408 to search for search property data 1406 representing a search property. Additionally and/or alternatively, second view area 1404 can further provide various search options 1410 (e.g., search property specific options, data location specific options, etc.) via exemplary user interface 1400. Accordingly, in response to receiving a command to conduct a search (e.g., via a user interface component or button 1412), various embodiments as described herein can use the search location 1408 and can search for a set of data locations satisfying the search property. As described herein, a search location can comprise a file or a folder, and the set of data locations can comprise a set of instances in a file or a set of instances in a set of files.

As a further non-limiting example, exemplary user interface 1400 can have a third view area 1414 that facilitates presenting the set of data locations satisfying the search property via exemplary user interface 1400. For instance, exemplary user interface 1400 presenting the set of data locations satisfying the search property in the third view area 1414 in a selectable and expandable tree view 1416 via exemplary user interface 1400. As depicted in exemplary user interface 1400, each item of the selectable and expandable tree view 1416 can be independently selected, unselected, expanded, collapsed, reviewed, and so on, etc., to facilitate efficient and selective search-and-replace of data associated with media content associated with files located on one or more data sources or locations. For instance, a user can select an item (e.g., hovering the mouse cursor over the item, clicking on the item, etc.) of the selectable and expandable tree view of the set of data locations, and in response thereto, exemplary user interface 1400 can facilitate displaying 1420 data representing the search property 1422 and a subset of surrounding content 1424 in the data location of the set of data locations. In a non-limiting aspect, exemplary user interface 1400 can facilitate displaying the data representing the search property and the subset of surrounding content, via exemplary user interface 1400, such as by displaying data representing an image, a word, a phrase, a sentence, or a paragraph associated with the search property. While for purposes of illustration, and not limitation, exemplary user interface 1400 is depicted as displaying the data representing the search property and the subset of surrounding content in a pop-up window, further non-limiting embodiments can display such data representing the search property and the subset of surrounding content using other techniques, for example, including, but not limited to, preview panes, output windows, etc. As a further non-limiting example, exemplary user interface 1400 can have a fourth view area 1426 that facilitates receiving data to replace the search property in a subset of the set of data locations via exemplary user interface 1400.

Figure 15:
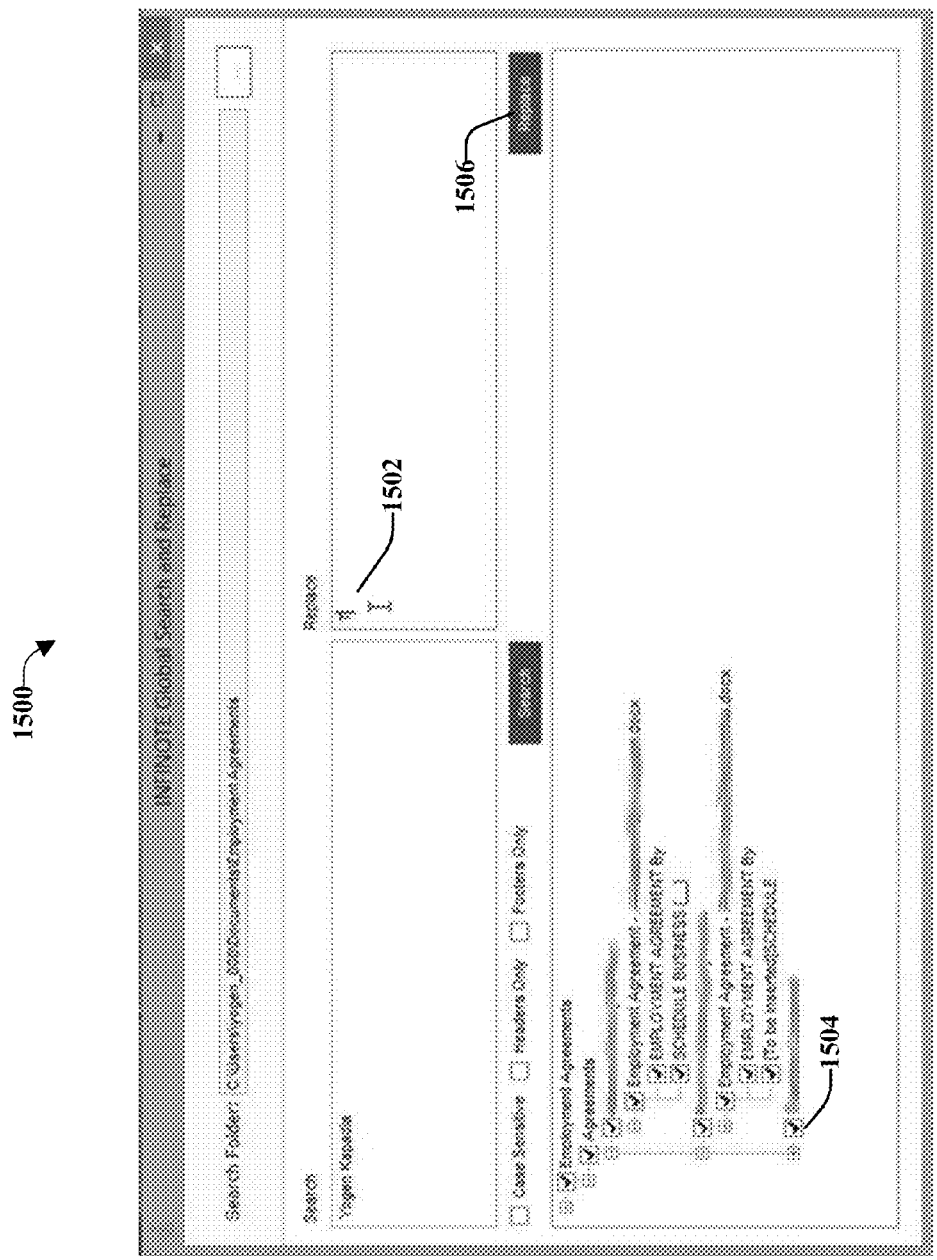
FIG. 15 depicts further non-limiting aspects of an exemplary user interface that facilitates efficient and selective search-and-replace of data associated with media content associated with files located on one or more data sources or locations in accordance with various embodiments described.

Accordingly, FIG. 15 depicts further non-limiting aspects of an exemplary user interface that facilitates efficient and selective search-and-replace of data associated with media content associated with files located on one or more data sources or locations. Various embodiments can receive data 1502 to replace the search property 1422 in a subset of the set of data locations exemplary user interface 1400/1500. For example, as described above, each item of the selectable and expandable tree view 1416 can be independently selected 1504, unselected, expanded, collapsed, reviewed, and so on, etc., to facilitate efficient and selective search-and-replace of data associated with media content associated with files located on one or more data sources or locations. Accordingly, in response to receiving a command to conduct a replace (e.g., via a user interface component or button 1506), various embodiments as described herein can replace the search property (e.g., 1422) with the data 1502 in the subset of the set of data locations in response to receiving a selection (e.g., 1504) of the subset via exemplary user interface 1400/1500.

Figure 16:
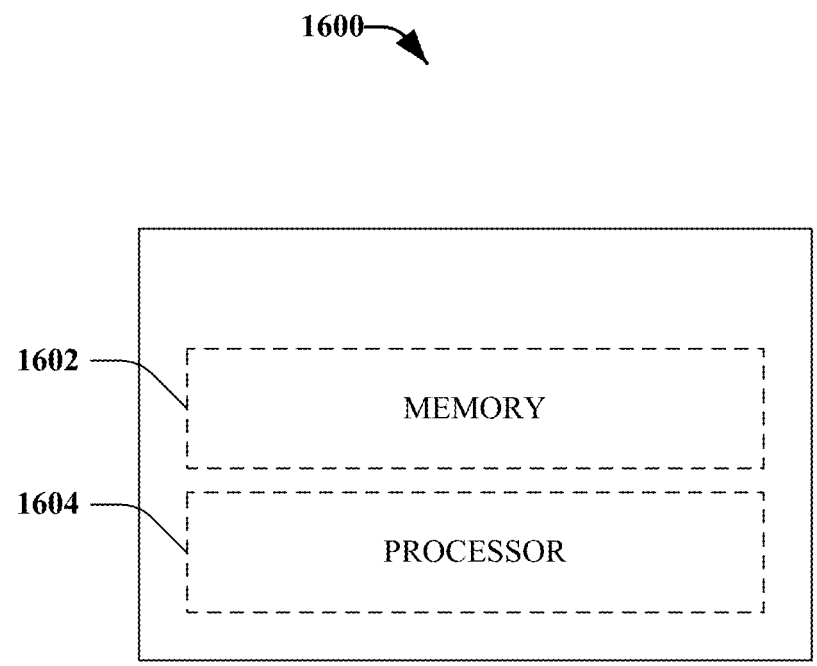
FIG. 16 depicts an exemplary non-limiting device or system suitable for performing various aspects of the disclosed subject matter.

FIG. 16 illustrates an exemplary non-limiting device or system 1600 suitable for performing various aspects of the disclosed subject matter. The device or system 1600 can be a stand-alone device or a portion thereof, a specially programmed computing device or a portion thereof (e.g., a memory retaining instructions for performing the techniques as described herein coupled to a processor), and/or a composite device or system comprising one or more cooperating components distributed among several devices, as further described herein. As an example, exemplary non-limiting device or system 1600 can comprise exemplary devices and/or systems, or portions thereof, regarding FIGS. 1-3 as described above, or as further described herein regarding FIGS. 4-15 and 17-20, or portions thereof.

Accordingly, device or system 1600 can include a memory 1602 that retains computer executable instructions that, in response to execution, cause a system comprising one or more processors (e.g., a system comprising one or more processors such as exemplary system 100, exemplary system 200, exemplary system 300, exemplary system or device 1600, client device 104, target device 106, server 108, etc.) to perform operations, for example, such as: receiving a first selection of a first file; receiving a second selection of second files (e.g., receiving a selection of files to be merged into the first file to create a new file comprising all of the set of differences, receiving a choice of files, where each file of the files comprises respective content associated with a corresponding section of the first file, and where the respective content is capable of being selected to be merged into the corresponding section of the first file, etc.); parsing the first file and the second files and determining a set of differences between the first file and the second files (e.g., a set of differences based on a predetermined value of a change threshold associated with a degree of difference between a portion of the first file and a corresponding portion of one of the second files); determining a correspondence between respective content and one or more corresponding section(s) of a first file; selecting of respective content and/or merging of respective content into one or more corresponding section(s) of a first file, based on the correspondence; presenting a list of the set of differences; determining that a change or edit attempted for a set of differences would result in a conflicting change or edit; presenting a notification about a conflicting change or edit via the user interface; and/or generating, in response to a request, a new file comprising a subset of data in the first file or one or more of the second files, wherein the request is based on a first subset of the set of differences (e.g., a new file comprising the first subset of the set of differences, where the first subset of the set of differences comprises differences that do not conflict between the second files, such as all non-conflicting differences, etc.).

In addition, device or system 1600 can include a memory 1602 that retains instructions for presenting a subset of the list of the set of differences based on receiving a command to accept, reject, display, or hide a second subset of the set of differences associated with authorship information related to one of the second files. Additionally, memory 1602 can retain instructions for one or more of presenting an option to accept or reject an individual difference in the list of the set of differences; and/or presenting an opportunity to undo an acceptance or a rejection of the individual difference in the list of the set of differences, regardless of an order in which the acceptance or the rejection of the individual difference was undertaken.

In yet another non-limiting example, memory 1602 can retain instructions with respect to facilitating various operations, for example, such as receiving a search location (e.g., one or more of a file or folder); receiving a search property; searching the search location for a set of data locations (e.g., one or more of a set of instances in a file or a set of instances in a set of files) satisfying the search property; presenting the set of data locations satisfying the search property (e.g., presenting the set of data locations satisfying the search property in a selectable and expandable tree view); and/or displaying the search property and a subset of surrounding content in a data location of the set of data locations (e.g., displaying an image, a word, a phrase, a sentence, or a paragraph associated with the search property) in response to the data location of the set of data locations being selected.

Additionally, memory 1602 can retain instructions for one or more of receiving data to replace the search property in a subset of the set of data locations; and/or replacing the search property with the data in the subset of the set of data locations in response to receiving a selection of the subset of the set of data locations.

The above example instructions and other suitable instructions for functionalities as described herein for example, regarding FIGS. 1-15 and 17-18, etc., can be retained within memory 1602, and a processor 1604 can be utilized in connection with executing the instructions. Finally, it should be understood that processes and techniques described herein are not inherently related to any particular apparatus and may be implemented by any suitable combination of components. In addition, while various embodiments are described herein, regarding functionality of systems described in reference to FIGS. 1-3, for the purpose of illustration, and not limitation, further non-limiting embodiments are possible regarding client or device interaction with the various non-limiting systems. Further, various types of general purpose devices may be used in accordance with the teachings described herein. The disclosed subject matter has been described in relation to particular examples, which are intended in all respects to be illustrative rather than restrictive. Those skilled in the art will appreciate that many different combinations of hardware, software, and firmware will be suitable for practicing the disclosed subject matter. For example, the disclosed subject matter may be implemented in any of a variety or combinations of programming languages including, but not limited to, Assembly, C/C++/C#, Python, Pert, shell script, PHP, Java, etc.

In view of the exemplary embodiments described supra, methods that can be implemented in accordance with the disclosed subject matter will be better appreciated with reference to the flowcharts of FIGS. 15-18. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be understood that various other branches, flow paths, and orders of the blocks, can be implemented which achieve the same or a similar result. Moreover, not all illustrated blocks may be required to implement the methods described hereinafter and further variations involving exemplary methods may not be illustrated for the purpose of simplicity of explanation. Additionally, it should be further understood that the methods and/or functionality disclosed hereinafter and throughout this specification are capable of being stored on an article of manufacture to facilitate transporting and transferring such methods to computers, for example, as further described herein. The terms computer readable medium, article of manufacture, and the like, as used herein, are intended to encompass a computer program accessible from any computer-readable device or media.

Exemplary Methods

Figure 17:
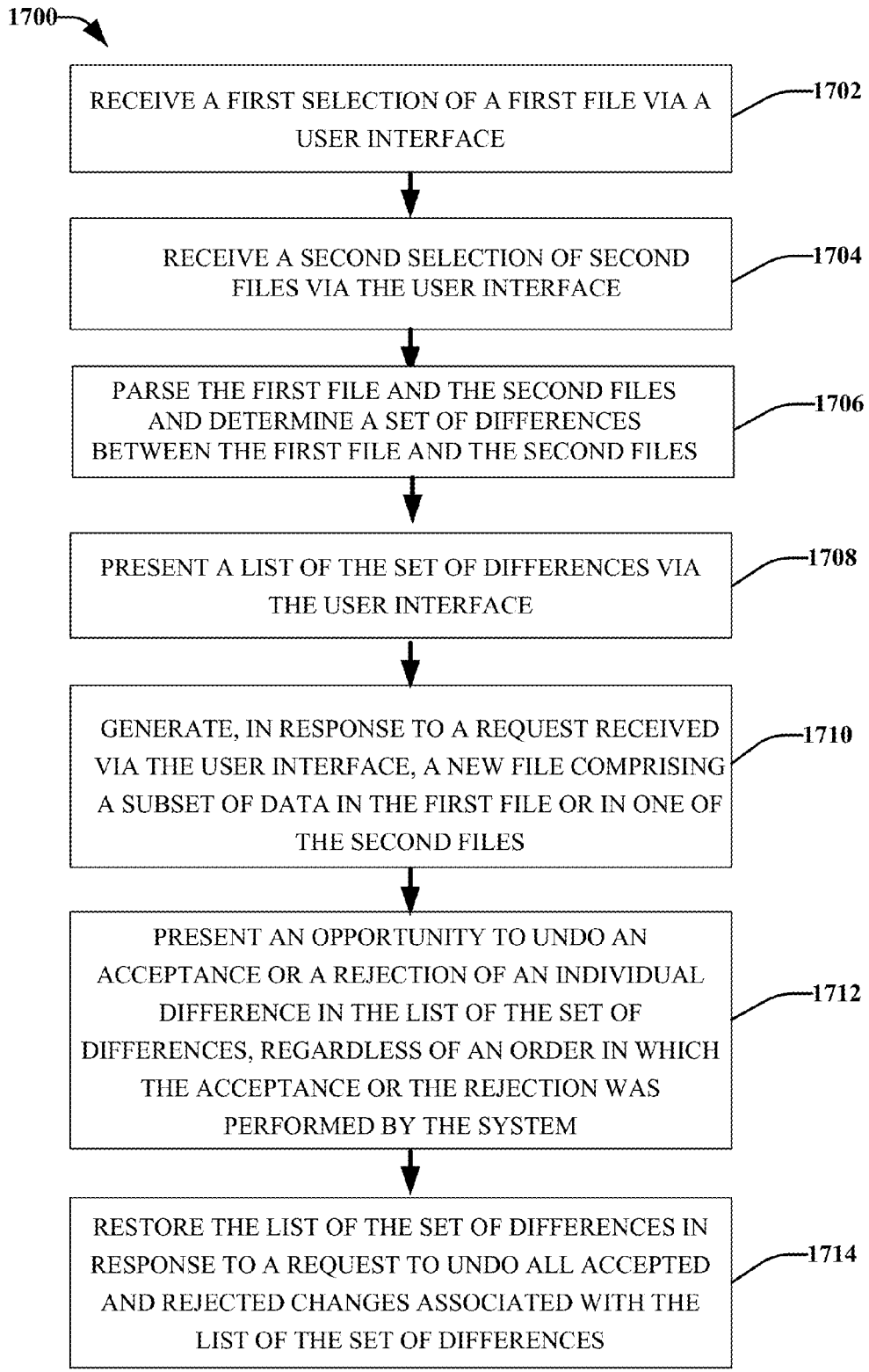
FIG. 17 illustrates an exemplary non-limiting flow diagram of methods for performing aspects of embodiments described herein.

Accordingly, FIG. 17 illustrates an exemplary non-limiting flow diagram of methods 1700 for performing aspects of embodiments described herein Reference is made to the figures described above for ease of description. However, the methods described herein are not limited to any particular embodiment or example provided within this disclosure. Thus, exemplary methods 1700 can comprise receiving (e.g., receiving by a system comprising one or more processors such as exemplary system 100, exemplary system 200, exemplary system 300, exemplary system or device

1600, etc.) a first selection of a first file via a user interface at 1702. In addition, exemplary methods 1700 can comprise, at 1704, receiving, by the system, a second selection of second files via the user interface. For instance, in a particular non-limiting implementation, the second files can comprise a set of three or more files. For instance, as described above regarding selection component 118, selection component 118 can be configured to receive one or more selections of data associated with media content, via a user interface such as a GUI to facilitate search, review, comparison, modification, replacement, and/or merging of data associated with media content. As further described above, the first file and/or second files can include or be associated with data associated with media content and can comprise words, text, data, and so on, associated with a document or other media content including audio, video, digital images, etc. As described, data associated with media content also include a word, words, sentences, paragraphs, sections, headings, titles, and/or any section of a media content (e.g., digital content, video, audio, text, and similar content).

Additionally, exemplary methods 1700 can further include receiving (e.g., receiving by exemplary system 100, exemplary system 200, exemplary system 300, exemplary system or device 1600, etc.) via the user interface an annotation related to the first file or one or more of the second files. For instance, an exemplary annotation can comprise authorship information. In a further non-limiting aspect, an exemplary annotation can comprise other information useful to discern changes or differences associated with the one or more second files from the data associated with media content related to the first file.

At 1706, exemplary methods 1700 can further comprise parsing (e.g., parsing by exemplary system 100, exemplary system 200, exemplary system 300, exemplary system or device 1600, etc.) the first file and the second files and determining a set of differences between the first file and the second files. As a non-limiting example, determining the set of differences can comprise determining the set of differences based on a predetermined value of a change threshold associated with a degree of difference between a portion of the first file and a corresponding portion of one of the second files. For instance, as described above regarding parsing component 120, a predetermined value of a change threshold (e.g., a paragraph change threshold, a sentence change threshold, a section change threshold, etc.) can be associated with a degree of difference between a portion of the first file and a corresponding portion of one of the second files. In a further non-limiting aspect, a first portion of a first document (e.g., data of the first file, data of the base document, etc.) can be determined by parsing component 120 to relate to, or be associated with, a second portion of a set of second documents, and, according to the predetermined value of a change threshold, can be determined to be a difference between the first document and one or more of the second documents (e.g., a difference between the base document and a number of the other documents).

Accordingly, a change threshold (e.g., a paragraph change threshold, a sentence change threshold, a section change threshold, etc.) can comprise or be associated with a match of one or more words of the one or more second documents with a portion of the first document (e.g., data of the first file, data of the base document, etc.), a match and/or correspondence of a particular degree of data of the one or more second documents with the portion of the first document (e.g., section, paragraph, a sentence, etc.), a match and/or correspondence of a particular degree of a section title or content of a set of second documents with a section title of a first document (e.g., data of the first file, data of the base document, etc.), a relevance score based on one or more of a set of predetermined criteria satisfying a condition, a frequency of reuse across different documents of a set of second documents satisfying a condition, a percentage of usage of a portion of a first document (e.g., data of the first file, data of the base document, etc.) within the set of second documents satisfying a condition, and/or a match and/or correspondence of a particular degree of metadata associated with a portion of a first document (e.g., data of the first file, data of the base document, etc.) with metadata associated with the one or more second documents. Thus, at 1706, exemplary methods 1700 can comprise determining (e.g., determining by exemplary system 100, exemplary system 200, exemplary system 300, exemplary system or device 1600, etc.) a set of differences between the first file and the second files.

In addition, as further described above regarding parsing component 120, parsing component 120 can be configured to determine a set of differences including determining a correspondence between the respective content and one or more corresponding section(s) of the first file (e.g., a base document, etc.). Moreover, review component 102 can be further configured facilitate selection of the respective content and/or merging of the respective content into the one or more corresponding section(s) of the first file (e.g., a base document, etc.), based at least in part on the correspondence. Accordingly, exemplary methods 1700 can further comprise, at 1706, determining a correspondence between the respective content and one or more corresponding section(s) of the first file (e.g., a base document, etc.), for example, to facilitate selecting of the respective content and/or merging of the respective content into the one or more corresponding section(s) of the first file (e.g., a base document, etc.), based at least in part on the correspondence.

Exemplary methods 1700 can further comprise, at 1708, presenting (e.g., presenting by exemplary system 100, exemplary system 200, exemplary system 300, exemplary system or device 1600, etc.) a list of the set of differences via the user interface. For instance, as described above regarding presentation component 122, a presentation component 122 can be configured to display a list of the set of differences between the first file (e.g., data of the first file, data of the base document, etc.) and one or more second files (e.g., any number of other documents, etc.) via the user interface to facilitate search, review, comparison, modification, replacement, and/or merging of data associated with media content of the first and second files.

For instance, exemplary methods 1700 can also comprise presenting, via the user interface (e.g., via presentation component 122, etc.), authorship information with the list of the set of differences, for example, as further described herein. Accordingly, exemplary methods 1700 can further comprise receiving (e.g., receiving by exemplary system 100, exemplary system 200, exemplary system 300, exemplary system or device 1600, etc.) a command via the user interface to accept, reject, display, or hide a second subset of the set of differences associated with the authorship information. Thus, as described above regarding presentation component 122, presentation component 122 can display a subset of the list of the set of differences, for example, based on receipt of a command to accept, reject, display, or hide a subset of the set of differences associated with the authorship information, to facilitate search, review, comparison, modification, replacement, and/or merging of data associated with media content of the first and second files.

As a further non-limiting example, a command can be received by review component 102, for example, to accept all changes or differences associated with a particular file of the second files (e.g., changes or differences associated with a particular author or reviewer, changes or differences made before or after a certain date or time, such as a file last modified date, changes or differences based on a file location associated with one or more of the second files, and so on, etc.), and in response thereto, presentation component 122 can display a reduced set of differences between the first file (e.g., data of the first file, data of the base document, etc.) and one or more second files (e.g., any number of other documents, etc.). Similarly, other commands can be received by review component 102, without limitation, and presentation component 122 can display an appropriate listing of the set of differences to facilitate search, review, comparison, modification, replacement, and/or merging of data associated with media content of the first and second files.

Accordingly, exemplary methods 1700 can further comprise presenting (e.g., via presentation component 122, etc.) a subset of the list of the set of differences via the user interface, based on the command and/or presenting (e.g., via presentation component 122, etc.) an option to accept or reject an individual difference in the list of the set of differences via the user interface. Thus, in response to an invocation of the option to accept or reject the individual difference, exemplary methods 1700 can further comprise annotating (e.g., via presentation component 122, etc.) the status of the option to accept or reject the individual difference via the user interface. As a non-limiting example, exemplary methods 1700 can comprise altering (e.g., via presentation component 122, etc.) a background, a font, a style, a format, or a behavior of text associated with the individual difference in the user interface, in response to the invocation of the option to accept or reject the individual difference.

In addition, exemplary methods 1700 can also comprise presenting (e.g., via presentation component 122, etc.) additional revision information associated with the individual difference in the list of the set of differences. In a non-limiting aspect, in response to receiving an indication of interest via the user interface, exemplary methods 1700 can comprise presenting (e.g., via presentation component 122, etc.) additional revision information associated with the individual difference in the list of the set of differences, for example, where the additional revision information comprises additional detail compared to a baseline amount of revision information. For example, as further described above, regarding presentation component 122, presentation component 122 can be configured to display the detailed revision information as data presented in pop-up window, in a panel of a multipanel GUI, in an output window, etc., and so on. Accordingly, the additional revision information can comprise additional detail of an associated changer difference in the list of the set of the changes or differences, whereas a baseline amount of revision information might include a paraphrased amount of the additional revision information.

In addition, at 1708, exemplary methods 1700 can comprise, additionally and/or alternatively, receiving the second selection of the second files comprising a choice of files, where each file of the files comprises respective content associated with a corresponding section of section of the first file, and where the respective content is selectable via the user interface to be merged into the corresponding section of the first file at 1704. For instance, as described above regarding selection component 118, selection component 118 can be configured to receive a choice of files (e.g., any number of other documents, etc.), where, for example, each file of the files can comprise data associated with media content, where the data comprises respective content associated with one or more corresponding section(s) of the first file (e.g., a base document, etc.), and for which review component 102 can facilitate selection of the respective content and merging of the respective content into the one or more corresponding section(s) of the first file (e.g., a base document, etc.). In addition, at 1708, exemplary methods 1700 can comprise, additionally and/or alternatively, presenting a series of listings of respective content in reverse chronological order of timestamps associated with the respective content via the user interface, and/or, presenting information associated with author, last modification, or location associated with the respective content via the user interface, to facilitate selection of the respective content and merging of the respective content into the one or more corresponding section(s) of the first file (e.g., a base document, etc.).

At 1710, exemplary methods 1700 can further comprise generating (e.g., generating by exemplary system 100, exemplary system 200, exemplary system 300, exemplary system or device 1600, etc.) in response to a request received via the user interface, one or more new files comprising a subset of data in the first file or in one of the second files. For instance, as described above regarding output component 124, output component 124 can be configured to generate one or more new files comprising some or all of the differences between the first file and the second files (e.g., all of the differences between the base document and the number of other documents), or at least a portion thereof, to facilitate search, review, comparison, modification, replacement, and/or merging of data associated with media content of the first and second files. In a non-limiting aspect, a request received via the user interface can be based on a first subset of the set of differences, where the first subset of the set of differences is able to be viewed, selected, or accepted as a set via the user interface to facilitate the request. In a further non-limiting aspect, exemplary methods 1700 can comprise generating one or more of a redlined file comprising annotations that indicate the subset of the set of differences (e.g., those changes or differences between the first file and the one or more second files) and/or a clean file without the annotations.

In a further non-limiting aspect of exemplary methods 1700, generating one or more new files can comprise generating one or more new files comprising the first subset of the set of differences, where the first subset of the set of differences comprises only differences between the first file and no more than one of the second files. As a non-limiting example, as described above output component 124 can generate one or more new files, in response to review component 102 receiving the request as indicated by singular action undertaken by a user via the user interface. Thus, various embodiments described herein can provide a button or other user interface component to facilitate generating the one or more new files comprising all non-conflicting changes or differences between the first file and the one or more second files that, in response to being selected by user via the user interface, can cause output component 124 to generate one or more new files. Similar interface components associated with review component 102 can be configured to facilitate output component 124 generation of the one or more new files according to other aspects described herein. For example, in a further non-limiting aspect, output component 124 can be configured to generate the one or more new files comprising the subset of data in the first file or in one or more of the second files, where the request received via the user interface is based on a subset of the set of differences, and where subset of the set of differences is able to be viewed, selected, and/or accepted and so on as a set via the user interface to facilitate the request. For instance, the first subset of the set of differences can be associated with all changes or differences attributable to a particular author or reviewer, all changes or differences occurring before or after a particular time, all changes or differences associated with a particular data location, and so on, etc.

In further non-limiting embodiments, exemplary methods 1700 can comprise, additionally and/or alternatively, receiving the second selection of the second files comprising a selection of files to be merged into the first file at 1704. For instance, as described above regarding selection component 118, selection component 118 can be configured to receive a selection of a base document and any number of other documents, for which review component 102 can facilitate search, review, comparison, modification, replacement, and/or merging of data associated with media content of the first and second files, where the one or more new file(s) comprise all of the differences between the first file and the second files (e.g., all of the differences between the base document and the number of other documents), or at least a portion thereof. Accordingly, in a further non-limiting aspect of exemplary methods 1700, generating one or more new files can comprise generating one or more new files comprising all of the set of differences at 1710. In other words, any number of second files can be selected and are merged into a first file. Thus, as described above, differences between the first file and the second files (e.g., the differences between the base document and the number of other documents) can comprise any of a number of revisions, deletions, additions, and/or comments associated with the data associated with media content (e.g., data of the first file, data of the base document, etc.).

Exemplary methods 1700 can further comprise, at 1712, presenting (e.g., presenting by exemplary system 100, exemplary system 200, exemplary system 300, exemplary system or device 1600, etc.) an opportunity to undo one or more of an acceptance or a rejection of an individual difference in the list of the set of differences via the user interface, regardless of an order in which the acceptance or the rejection of the individual difference was performed by the system. For example, as described above regarding presentation component 122, presentation component 122 can be further configured to display an option to accept and/or reject an individual difference in the list of the set of differences to facilitate search, review, comparison, modification, replacement, and/or merging of data associated with media content of the first and second files. In another non-limiting aspect, presentation component 122 can be further configured to provide an opportunity to undo one or more of an acceptance or a rejection of an individual difference in the list of the set of differences. In still further non-limiting aspects, presentation component 122 can be configured to provide an opportunity to undo one or more of an acceptance or a rejection of an individual difference in the list of the set of differences, regardless of the order in which the one or more of the acceptance or the rejection of the individual difference was undertaken.

At 1714, exemplary methods 1700 can further comprise restoring (e.g., restoring by exemplary system 100, exemplary system 200, exemplary system 300, exemplary system or device 1600, etc.) the list of the set of differences via the user interface in response to receiving a request to undo all accepted and rejected changes associated with the list of the set of differences. For example, as described above regarding modification component 126, modification component 126 can be further configured to restore the list of the set of differences via the user interface, for example, in response to receiving a request to undo all accepted and rejected changes associated with the list of the set of differences, to facilitate search, review, comparison, modification, replacement, and/or merging of data associated with media content of the first and second files.

As further described above, review component 102 and/or a portion thereof (e.g. modification component 126, etc.) can be configured to receive user input (e.g., user input associated with mouse, keyboard, touch screen, and/or other human interface devices, etc.) associated with selections, commands, requests, and/or other indications, and so on to facilitate search, review, comparison, modification, replacement, and/or merging of data associated with media content of the first and second files. As a non-limiting example, modification component 126 can be configured to receive a command via the user interface to facilitate one or more of accepting, rejecting, displaying, and/or hiding a subset of the set of differences associated with information (e.g., indicating authorship, or otherwise, etc.) related to the first and/or one or more of the second files. Accordingly, in a further non-limiting aspect of modification component 126, a subset of the set of changes or differences can be accepted, rejected, displayed, and/or hid, as further described above, via the user interface, based on authorship information, based on information associated with a date and/or time, based on information associated with a file location, and so on, etc. In addition, according to a further non-limiting aspect of modification component 126, review component 102 and/or a portion thereof (e.g. modification component 126, etc.) is operable to receive input via the user interface to add or delete content associated with the individual difference of the list of the set of differences (e.g., such as by a user selecting the individual change or difference and/or editing content associate with individual difference). Accordingly, exemplary methods 1700 can further comprise receiving (e.g., receiving by exemplary system 100, exemplary system 200, exemplary system 300, exemplary system or device 1600, etc.) input via the user interface to add or delete content associated with the individual difference. Thus, in a non-limiting aspect, exemplary methods 1700 can also comprise presenting the added or deleted content via the user interface (e.g., via presentation components 122, etc.) differently based on the whether the content is an addition or deletion.

In addition, exemplary methods 1700 can further comprise determining (e.g., determining by exemplary system 100, exemplary system 200, exemplary system 300, exemplary system or device 1600, etc.) that a change or edit attempted for a set of differences would result in a conflicting change or edit, for example, as further described above regarding FIGS. 1, 10, etc. Accordingly, in response to a determination that a change or edit attempted for a set of differences would result in a conflicting change or edit, presentation component 122 can, via the user interface, present a notification about a conflicting change or edit via the user interface, for example, so as to inform a user that further review may be necessary. Thus, exemplary methods 1700 can further comprise presenting (e.g., presenting by exemplary system 100, exemplary system 200, exemplary system 300, exemplary system or device 1600, etc.) a notification about a conflicting change or edit via the user interface, for example, in response to a determination that a change or edit attempted for a set of differences would result in a conflicting change or edit. As non-limiting examples, such notifications can comprise or be associated with changing of a background, a font, a style, a format, or a behavior of text associated with the conflicting change or edit, a pop-up message, for example, without limitation.

Figure 18:
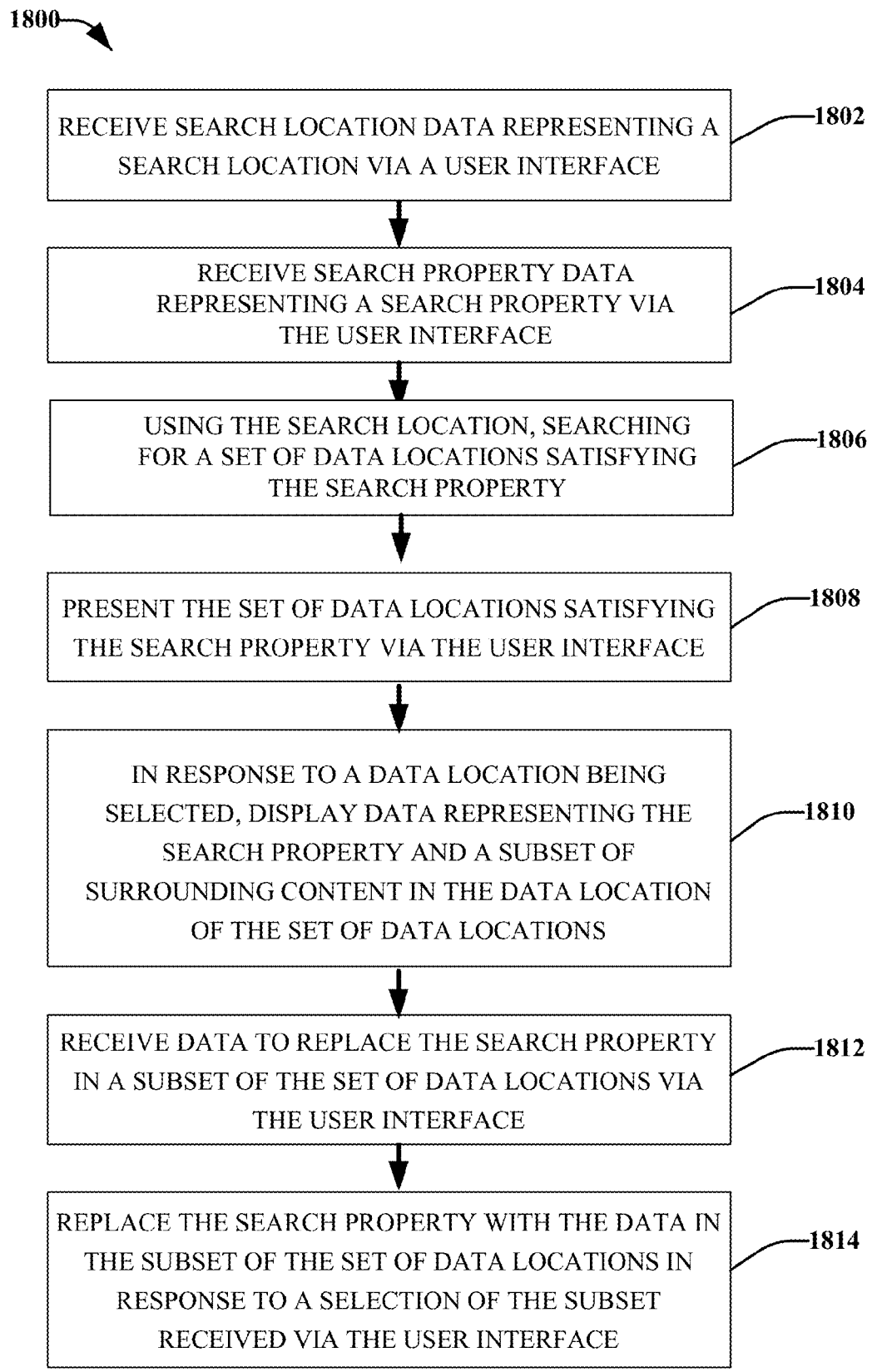
FIG. 18 depicts an exemplary non-limiting flow diagram illustrating various aspects of exemplary methods described herein.

FIG. 18 depicts an exemplary non-limiting flow diagram illustrating various aspects of exemplary methods 1800 described herein. Exemplary methods 1800 can comprise receiving (e.g., receiving by exemplary system 100, exemplary system 200, exemplary system 300, exemplary system or device 1600, etc.) search location data representing a search location via a user interface at 1802. At 1804, exemplary methods 1800 can further comprise receiving (e.g., receiving by exemplary system 100, exemplary system 200, exemplary system 300, exemplary system or device 1600, etc.) search property data representing a search property via the user interface. For instance, as described above regarding selection component 118, selection component 118 can, additionally and/or alternatively, be configured to receive one or more of a search location and a search property. As non-limiting examples, search location can comprise information about location of data associated with media content related to files located on one or more data sources or locations (e.g., client device 104, target device 106, server 108, data source(s) 110, data store 112, memory 114, and so on, etc.). As a further non-limiting example, a search location can comprise one or more of a file or folder. In another aspect, a set of data locations can comprise one or more of a set of instances in a file or a set of instances in a set of files. In yet another non-limiting aspect, a search property can comprise data and/or information about which information about the instances and/or files in the search location is sought.

Exemplary methods 1800 can also comprise using the search location, searching (e.g., searching by exemplary system 100, exemplary system 200, exemplary system 300, exemplary system or device 1600, etc.) for a set of data locations satisfying the search property, at 1806.

At 1808, exemplary methods 1800 can further comprise presenting (e.g., presenting by exemplary system 100, exemplary system 200, exemplary system 300, exemplary system or device 1600, etc.) the set of data locations satisfying the search property via the user interface. For instance, as further described above regarding presentation component 122, presentation component 122 can, additionally and/or alternatively, be configured to display the set of data locations satisfying the search property in a selectable and expandable tree view. Thus, by facilitating expansion of the set of data locations in an expandable tree view, and by allowing independently selectable data locations in the set of data locations, review component 102, comprising selection component 118, presentation component 122, modification component 126, and/or search and replace component 202, can facilitate efficient and selective search-and-replace of data associated with media content associated with files located on one or more data sources or locations (e.g., client device 104, target device 106, server 108, data source(s) 110, data store 112, memory 114, and so on, etc.). That is, each of the data locations of the set of data locations can be selected, reviewed, compared, and/or identified for replacement of the search property by the data received (e.g., data received by selection component 118 to replace the search property in a subset of the set of data locations) independently of the desired actions for the other data locations of the set of data locations.

Exemplary methods 1800 can also comprise displaying (e.g., displaying by exemplary system 100, exemplary system 200, exemplary system 300, exemplary system or device 1600, etc.) data representing the search property and a subset of surrounding content in a data location of the set of data locations, at 1810, in response to the data location of the set of data locations being selected via the user interface. For instance, as further described above regarding presentation component 122, presentation component 122 can, additionally and/or alternatively, display the set of data locations satisfying the search property, where presentation component 122 can be further configured to display the search property and a subset of surrounding content in a data location of the set of data locations in response to the data location of the set of data locations being selected. As a further non-limiting example, displaying the data representing the search property and the subset of surrounding content can comprise displaying, via the user interface, data representing an image, a word, a phrase, a sentence, or a paragraph associated with the search property and comprising a portion of data associated with media content at the respective data location of the set of data locations. For instance, in response to selection (e.g., via a mouse click, mouse over, and so on, etc.) of a particular data location (e.g., an instance in a file that satisfies the search property), presentation component 122 can display the search property as it exists in the file (e.g., at one or more instances in the file that the search property is satisfied) along with contextual data and/or information that surrounds the one or more instances in the file the search property is satisfied.

At 1812, exemplary methods 1800 can further comprise receiving (e.g., receiving by exemplary system 100, exemplary system 200, exemplary system 300, exemplary system or device 1600, etc.) data to replace the search property in a subset of the set of data locations via the user interface. For instance, as described above regarding selection component 118, selection component 118 can, additionally and/or alternatively, be configured to receive data to replace the search property or data representing the search property in a subset of the set of data locations (e.g., a set of instances in a file or a set of instances in a set of files, etc.).

In addition, exemplary methods 1800 can also comprise replacing (e.g., receiving by exemplary system 100, exemplary system 200, exemplary system 300, exemplary system or device 1600, etc.) the search property or data representing a search property with the data in the subset of the set of data locations in response to receiving a selection of the subset via the user interface, at 1814. As a non-limiting example, review component 102, comprising selection component 118, modification component 126, and/or search and replace component 202, is operable to receive a search location and a search term or phrase, for which to search documents residing at the search location. In a further non-limiting aspect, parsing component 120 can, additionally and/or alternatively, be configured to one or more of search the search location for a set of data locations that satisfy the search property, parse data associated with media content to facilitate determining whether the location satisfies the search property, and so on, etc. As a non-limiting example, parsing component 120 can be configured to one or more of parse one or more files residing at the search location, identify one or more instances in a file or a set of instances in a set of files that satisfy the search property, and so on. In addition, as above, review component 102 is operable to receive selections, commands, requests, and/or other indications, and so on associated with options provided to facilitate search, review, comparison, modification, replacement, and/or merging of data associated with media content. Accordingly, in a further non-limiting aspect, modification component 126, comprising search and replace component 202, can be further configured to replace the search property with the data in the subset of the set of data locations in response to receipt of a selection (e.g., review component 102, portions thereof, etc.) of the subset of the set of data locations.

Exemplary Networked and Distributed Environments

One of ordinary skill in the art can appreciate that the various embodiments for search, review, comparison, modification, replacement, and/or merging of data associated with media content described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 19:
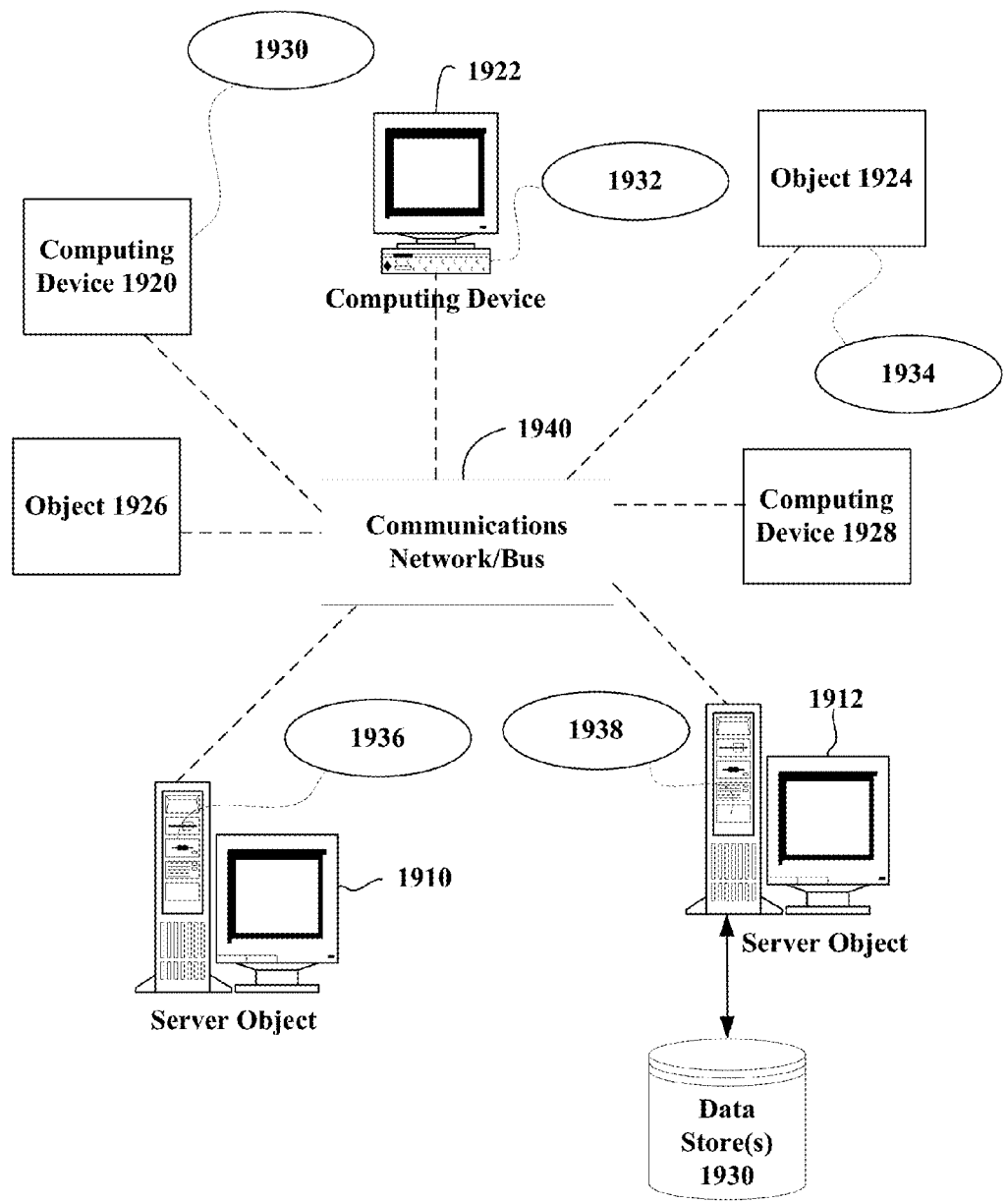
FIG. 19 is a block diagram representing exemplary non-limiting networked environments in which various embodiments described herein can be implemented.

FIG. 19 provides a non-limiting schematic diagram of an exemplary networked or distributed computing environment. The distributed computing environment comprises computing objects or devices 1910, 1912, etc. and computing objects or devices 1920, 1922, 1924, 1926, 1928, etc., which may include programs, methods, data stores, programmable logic, etc., as represented by applications 1930, 1932, 1934, 1936, 1938. It can be appreciated that computing objects or devices 1910, 1912, etc. and computing objects or devices 1920, 1922, 1924, 1926, 1928, etc. may comprise different devices, such as PDAs, audio/video devices, mobile phones, MP3 players, laptops, etc., as well as various software and/or hardware objects supported by a given device.

Computing objects or devices 1910, 1912, etc. and computing objects or devices 1920, 1922, 1924, 1926, 1928, etc. can communicate with one or more other computing objects or devices 1910, 1912, etc. and computing objects or devices 1920, 1922, 1924, 1926, 1928, etc. by way of the communications network 1940, either directly or indirectly. Even though illustrated as a single element in FIG. 19, network 1940 may comprise other computing objects and computing devices that provide services to an embodiment of the system of FIG. 19, and/or may represent multiple interconnected networks, which are not shown. The computing objects or devices 1910, 1912, etc. or 1920, 1922, 1924, 1926, 1928, etc. can also contain an application, such as applications 1930, 1932, 1934, 1936, 1938, that might make use of an application programming interface (API), or other object, software, firmware and/or hardware, suitable for communication with or implementation of systems as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as cloud technologies, software as a service, client/server, peer-to-peer, or hybrid architectures, can be utilized. In a client/server architecture, particularly a networked system, a client usually refers to a computer that accesses network resources or services provided by another computer, e.g., a server. In the illustration of FIG. 19, as a non-limiting example, computing objects or devices 1920, 1922, 1924, 1926, 1928, etc. can be thought of as clients and computing objects or devices 1910, 1912, etc. can be thought of as servers where computing objects or devices 1910, 1912, etc. provide data services, such as receiving data from computing objects or devices 1920, 1922, 1924, 1926, 1928, etc., storing of data, processing of data, transmitting data to computing objects or devices 1920, 1922, 1924, 1926, 1928, etc., although any computer can be considered a client, a server, or both, depending on the circumstances. In a peer to peer architecture, typically computing objects or devices 1920, 1922, 1924, 1926, 1928, etc. and computing objects or devices 1910, 1912, etc. interact with one another without classification as servers or clients, since at any given moment, the roles of a given node may change depending on the current functions of the node. Any of these computing devices may be processing data, or requesting services or tasks that may implicate one or more aspects of techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to techniques as described herein can be provided standalone, or distributed across multiple computing devices or objects.

In a network environment in which the communications network/bus 1940 is the Internet, for example, the computing objects or devices 1910, 1912, etc. can be Web servers with which the computing objects or devices 1920, 1922, 1924, 1926, 1928, etc. communicate via any of a number of known protocols, such as HTTP. As mentioned, computing objects or devices 1910, 1912, etc. may also serve as computing objects or devices 1920, 1922, 1924, 1926, 1928, etc., or vice versa, as may be characteristic of a distributed computing environment.

Exemplary Computing Device

As mentioned, various embodiments described herein apply to any device wherein it may be desirable to search, review, comparison, modification, replacement, and/or merging of data associated with media content described herein. It is understood, therefore, that handheld, portable and other computing devices and computing objects of all kinds are contemplated for use in connection with the various embodiments described herein, i.e., anywhere that a device may provide some functionality in connection with search, review, comparison, modification, replacement, and/or merging of data associated with media content described herein. Accordingly, the below general purpose remote computer described below in FIG. 20 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 20:
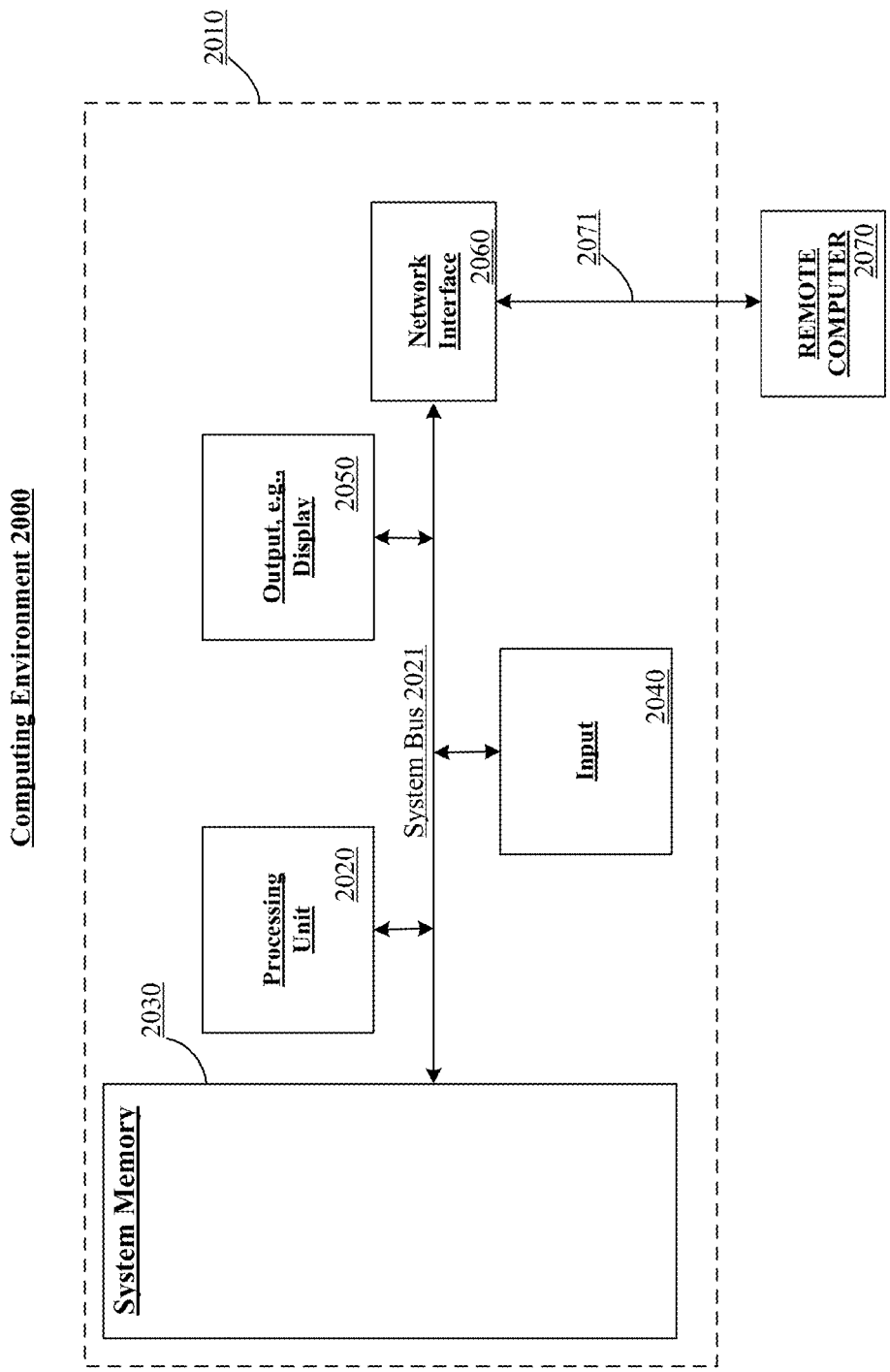
FIG. 20 is a block diagram representing an exemplary non-limiting computing system or operating environment in which one or more aspects of various embodiments described herein can be implemented.

FIG. 20 thus illustrates an example of a suitable computing system environment 2000 in which one or more of the embodiments may be implemented, although as made clear above, the computing system environment 2000 is only one example of a suitable computing environment and is not intended to suggest any limitation as to the scope of use or functionality of any of the embodiments. The computing environment 2000 is not to be interpreted as having any dependency or requirement relating to any one or combination of components illustrated in the exemplary operating environment 2000.

With reference to FIG. 20, an exemplary remote device for implementing one or more embodiments herein can include a general purpose computing device in the form of a handheld computer 2010. Components of handheld computer 2010 may include, but are not limited to, a processing unit 2020, a system memory 2030, and a system bus 2021 that couples various system components including the system memory to the processing unit 2020.

Computer 2010 typically includes a variety of computer readable media and can be any available media that can be accessed by computer 2010. The system memory 2030 may include computer storage media in the form of volatile and/or nonvolatile memory such as read only memory (ROM) and/or random access memory (RAM). By way of example, and not limitation, memory 2030 may also include an operating system, application programs, other program modules, and program data. In this regard, computer-readable media can be any available media that can be accessed by the computer including removable and non-removable media.

By way of example, and not limitation, computer-readable media can comprise computer storage media and/or communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, Electrically Erasable Programmable Read-Only Memory (EEPROM), flash memory, universal serial bus (USB) drives, or other memory technology, compact disk (CD), digital versatile disk (DVD) or other optical disk storage, magnetic cassettes, magnetic tape, magnetic disk storage, or other magnetic storage devices, or any other medium which can be used to store information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

A user may enter commands and information into the computer 2010 through input devices 2040. A monitor or other type of display device is also connected to the system bus 2021 via an interface, such as output interface 2050. In addition to a monitor, computers may also include other peripheral output devices such as speakers and a printer, which may be connected through output interface 2050.

The computer 2010 may operate in a networked or distributed environment using logical connections to one or more other remote computers, such as remote computer 2070. The remote computer 2070 may be a personal computer, a server, a router, a network PC, a peer device or other common network node, or any other remote media consumption or transmission device, and may include any or all of the elements described above relative to the computer 2010. The logical connections depicted in FIG. 20 include a network 2071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and memory architectures, the underlying concepts may be applied to any network system and any computing device or storage system in which it is desirable to search, review, compare, modify, replace, and/or merge data associated with media content as described herein.

There are multiple ways of implementing one or more of the embodiments described herein, e.g., an appropriate API, tool kit, driver code, operating system, control, standalone or downloadable software object, executable code, etc. which enables applications and services to use or access the various described embodiments from any platform. Embodiments may be contemplated from the standpoint of an API (or other software object), as well as from a software or hardware object that facilitates provision of disclosed techniques in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the various embodiments should not be limited to any single embodiment, but rather should be construed in breadth and scope in accordance with the appended claims.

What is claimed is:

1. A method, comprising:
receiving, by a system comprising at least one processor, a first selection of a base file via a user interface;
receiving, by the system, a second selection of a plurality of files via the user interface;
wherein the plurality of files includes at least a first file and a second file;
parsing by the system, the base file and the plurality of files and determining a set of differences between the base file and each file of the plurality of files;
wherein the set of differences includes:
a first difference that is between the base file and the first file but not between the base file and the second file, and
a second difference that is between the base file and the second file but not between the base file and the first file;
presenting, by the system, a list of the set of differences via the user interface;
wherein the user interface provides a plurality of controls, wherein the plurality of controls includes a particular control which, when activated, causes the system to automatically identify and accept all non-conflicting differences in the set of differences;
receiving user input that selects, the particular control;
in response to the user input, causing the system to accept all non-conflicting differences from the set of differences;
wherein the non-conflicting differences accepted by the user includes the first difference and the second difference; and
generating, by the system, in response to a request received via the user interface, a new file that is created by modifying the base file to include a particular set of differences that have been accepted by the user.

2. The method of claim 1, wherein the plurality of files comprises a set of at least three files.

3. The method of claim 1, wherein the generating comprises generating at least one of: a redlined file comprising annotations that indicate the particular set of differences, or a clean file that includes the particular set of differences without the annotations.

4. The method of claim 1, wherein the particular set of differences includes all non-conflicting differences in the set of differences.

5. The method of claim 1, wherein the set of differences includes differences caused a plurality of authors, and the controls provided by the user interface include at least one control for accepting differences, from the set of differences, based on which author of the plurality of authors caused the differences.

6. The method of claim 5, further comprising:
presenting, by the system, via the user interface, authorship information with the list of the set of differences.

7. The method of claim 1 wherein the controls include a first control to at least one of accept or reject an individual difference from the list of the set of differences via the user interface.

8. The method of claim 7, further comprising:
displaying, on the user interface, a second control for undoing all accepted and rejected changes; and
restoring, by the system, the list of the set of differences via the user interface in response to receiving, through the second control, a request to undo all accepted and rejected changes associated with the list of the set of differences.

9. The method of claim 7, further comprising:
in response to an invocation of the first control to at least one of accepting or rejecting the individual difference, annotating, by the system, a status of the first control to at least one of accepting or rejecting the individual difference via the user interface.

10. The method of claim 9, wherein the annotating comprises altering at least one of a background, a font, a style, a format, or a behavior of text associated with the individual difference in the user interface, in response to the invocation.

11. The method of claim 1, wherein the first file is a first copy of the base file to which a first reviewer has added changes, and the second file is a second copy of the base file to which a second reviewer has added changes.

12. The method of claim 1,
wherein the receiving the second selection of the plurality of files comprises receiving a choice of files,
wherein each file of the files comprises respective content associated with at least one corresponding section of sections of the base file,
wherein determining the set of differences between the base file and the plurality of files comprises determining a correspondence between the respective content and the at least one corresponding section of sections of the base file, and
wherein the respective content is selectable via the user interface to be merged into the at least one corresponding section of the base file based at least in part on the correspondence.

13. The method of claim 12, wherein presenting the list of the set of differences via the user interface comprises presenting a series of listings of respective content in reverse chronological order of timestamps associated with the respective content via the user interface.

14. The method of claim 13, wherein the presenting the series of listings comprises presenting, via the user interface, at least one of:
information associated with author,
last modification, or
location associated with the respective content.

15. The method of claim 1, wherein:
the set of differences includes a third difference that is between the base file and the first file but not between the base file and the second file;
the third difference conflicts with the second difference;
the method further comprises:
determining that the third difference conflicts with the second difference; and
in response to determining that the third difference conflicts with the second difference, presenting a notification about the conflicting differences via the user interface.

16. A method, comprising:
receiving, by a system comprising at least one processor, a first selection of a base file via a user interface;
receiving, by the system, a second selection of plurality of files via the user interface;
wherein the plurality of files includes at least a first file and a second file;
parsing by the system, the base file and the plurality of files and determining a set of differences between the base file and each file of the plurality of files;
wherein determining the set of differences between the base file and each file of the plurality of files includes:
identifying a first difference between the base file and the first file;
determining whether the first difference is above a predetermined change threshold associated with a degree of difference;
in response to determining that the first difference is above the predetermined change threshold, including the first difference in the set of differences;
identifying a second difference between the base file and the second file;
determining whether the second difference is above the predetermined change threshold; and
in response to determining that the second difference is not above the predetermined changed threshold, excluding the second difference from the set of differences; and
presenting, by the system, a list of the set of differences via the user interface.

17. A method, comprising:
receiving, by a system comprising at least one processor, a first selection of a base file via a user interface;
receiving, by the system, a second selection of plurality of files via the user interface;
parsing by the system, the base file and the plurality of files and determining a set of differences between the base file and each file of the plurality of files;
presenting, by the system, a list of the set of differences, wherein the set of differences include differences from a plurality of authors;
while presenting the list of the set of differences, receiving, by the system, a command via the user interface to hide those differences associated with at least one author of the plurality of authors; and
in response to the command, presenting, by the system, a subset of the list of the set of differences via the user interface, wherein the subset excludes all differences made by the at least one author;
receiving, through interaction with the subset of the list, commands to accept or reject differences; and
after receiving the commands, generating, by the system, in response to a request received via the user interface, a new file that is created by modifying the base file to include differences accepted by the user.

18. A method, comprising:
receiving, by a system comprising at least one processor, a first selection of a base file via a user interface;
receiving, by the system, a second selection of a plurality of files via the user interface;
wherein the plurality of files includes at least a first file and a second file;
parsing by the system, the base file and the plurality of files and determining a set of differences between the base file and each file of the plurality of files;
presenting, by the system, a list of the set of differences via the user interface;
wherein the user interface provides a plurality of controls, wherein the controls include a first control to at least one of accept or reject an individual difference from the list of the set of differences via the user interface;
receiving user input that selects the first control;
in response to the user input, causing the system to accept or reject the individual difference; and
after one or more differences have been accepted or rejected subsequent to the acceptance or rejection of the individual difference, presenting, by the system, an opportunity to undo the acceptance or rejection of the individual difference without affecting the acceptance or rejection of the one or more differences.

19. A non-transitory computer readable storage medium comprising computer executable instructions that, in response to execution, cause a system comprising at least one processor to perform operations, comprising:

receiving, by a system comprising at least one processor, a first selection of a base file via a user interface;

receiving, by the system, a second selection of plurality of files via the user interface;

wherein the plurality of files includes at least a first file and a second file;

parsing by the system, the base file and the plurality of files and determining a set of differences between the base file and each file of the plurality of files;

wherein the set of differences includes:
  a first difference that is between the base file and the first file but not between the base file and the second file, and
  a second difference that is between the base file and the second file but not between the base file and the first file;

presenting, by the system, a list of the set of differences via the user interface;

wherein the user interface provides a plurality of controls, wherein the plurality of controls includes a particular control which, when activated, causes the system to automatically identify and accept all non-conflicting differences in the set of differences;

receiving user input that selects the particular control;

in response to the user input, causing the system to accept all non-conflicting differences from the set of differences;

wherein the non-conflicting differences accepted by the user include the first difference and the second difference; and generating, by the system, in response to a request received via the user interface, a new file that is created by modifying the base file to include a particular set of differences that have been accepted by the user.

20. The non-transitory computer readable storage medium of claim 19, wherein the plurality of files comprises a set of at least three files.

21. The non-transitory computer readable storage medium of claim 19, wherein the generating comprises generating at least one of a redlined file comprising annotations that indicate the particular set of differences or a clean file that includes the particular set of differences without the annotations.

22. The non-transitory computer readable storage medium of claim 19, wherein the controls provided by the user interface include a control which, when activated, causes the system to automatically identify and accept all non-conflicting differences in the set of differences.

23. The non-transitory computer readable storage medium of claim 19, wherein determining the set of differences comprises determining the set of differences based on a predetermined value of a change threshold associated with a degree of difference between a portion of the base file and a corresponding portion of one of the plurality of files.

24. The non-transitory computer readable storage medium of claim 19, wherein the set of differences includes differences caused a plurality of authors, and the controls provided by the user interface include at least one control for accepting differences, from the set of differences, based on which author of the plurality of authors caused the differences.

25. The non-transitory computer readable storage medium of claim 24, further comprising:
  presenting, by the system, via the user interface, authorship information with the list of the set of differences.

26. The non-transitory computer readable storage medium of claim 25, further comprising:

receiving, by the system, a command via the user interface to hide differences associated with at least one of the plurality of authors; and presenting, by the system, a subset of the list of the set of differences via the user interface, based on the command.

27. The non-transitory computer readable storage medium of claim 19, wherein the controls include a first control to at least one of accept or reject an individual difference in the list of the set of differences via the user interface.

28. The non-transitory computer readable storage medium of claim 27, further comprising:
  presenting, by the system, an opportunity to undo at least one of an acceptance or a rejection of the individual difference in the list of the set of differences via the user interface, regardless of an order in which the at least one of the acceptance or the rejection of the individual difference was performed by the system.

29. The non-transitory computer readable storage medium of claim 27, further comprising:
  displaying, on the user interface, a second control for undoing all accepted and rejected changes; and
  restoring, by the system, the list of the set of differences via the user interface in response to receiving, through the second control, a request to undo all accepted and rejected changes associated with the list of the set of differences.

30. The non-transitory computer readable storage medium of claim 27, further comprising:
  in response to an invocation of the first control to at least one of accept or reject the individual difference, annotating, by the system, a status of the first control to at least one of accept or reject the individual difference via the user interface.

31. The non-transitory computer readable storage medium of claim 30, wherein the annotating comprises altering at least one of a background, a font, a style, a format, or a behavior of text associated with the individual difference in the user interface, in response to the invocation.

32. The non-transitory computer readable storage medium of claim 19, wherein the first file is a first copy of the base file to which a first reviewer has added changes, and the second file is a second copy of the base file to which a second reviewer has added changes.

33. The non-transitory computer readable storage medium of claim 19,
  wherein the receiving the second selection of the plurality of files comprises receiving a choice of files,
  wherein each file of the files comprises respective content associated with at least one corresponding section of sections of the base file,
  wherein determining the set of differences between the base file and the plurality of files comprises determining a correspondence between the respective content and the at least one corresponding section of sections of the base file, and
  wherein the respective content is selectable via the user interface to be merged into the at least one corresponding section of the base file based at least in part on the correspondence.

34. The non-transitory computer readable storage medium of claim 33, wherein presenting the list of the set of differences via the user interface comprises presenting a series of listings of respective content in reverse chronological order of timestamps associated with the respective content via the user interface.

35. The non-transitory computer readable storage medium of claim 34, wherein the presenting the series of listings comprises presenting, via the user interface, at least one of:
information associated with author,
last modification, or
location associated with the respective content.

36. The non-transitory computer readable storage medium of claim 19, wherein:
the set of differences includes a third difference that is between the base file and the first file but not between the base file and the second file;
the third difference conflicts with the second difference;
the non-transitory computer readable storage medium further comprises:
determining that the third difference conflicts with the second difference; and
in response to determining that the third difference conflicts with the second difference, presenting a notification about the conflicting differences via the user interface.

* * * * *